US012467248B2

(12) United States Patent
Cole et al.

(10) Patent No.: US 12,467,248 B2
(45) Date of Patent: Nov. 11, 2025

(54) POWERED DRAIN CLEANER WITH FLEX SHAFT

(71) Applicant: Ridge Tool Company, Elyria, OH (US)

(72) Inventors: Alex Michael Cole, Columbia Station, OH (US); Jeffrey Szucs, Columbia Station, OH (US); Jacob Schneider, Elyria, OH (US); Michael J. Rutkowski, North Royalton, OH (US)

(73) Assignee: Ridge Tool Company, Elyria, OH (US)

( * ) Notice: Subject to any disclaimer, the term of this patent is extended or adjusted under 35 U.S.C. 154(b) by 1163 days.

(21) Appl. No.: 17/174,464

(22) Filed: Feb. 12, 2021

(65) Prior Publication Data

US 2021/0172162 A1 Jun. 10, 2021

Related U.S. Application Data

(63) Continuation-in-part of application No. 16/420,383, filed on May 23, 2019, now Pat. No. 10,987,708.

(60) Provisional application No. 62/976,714, filed on Feb. 14, 2020, provisional application No. 62/797,744, filed on Jan. 28, 2019.

(51) Int. Cl.

| | |
|---|---|
| ***E03F 9/00*** | (2006.01) |
| ***B08B 9/043*** | (2006.01) |
| ***B08B 9/045*** | (2006.01) |

(52) U.S. Cl.

CPC ............ *E03F 9/005* (2013.01); *B08B 9/0436* (2013.01); *B08B 9/045* (2013.01)

(58) Field of Classification Search

CPC .......... E03F 9/002; E03F 9/005; B08B 9/045; B08B 9/043; B08B 9/0436; B08B 2209/04; B65H 57/12; B65H 57/18

USPC ...................................................... 15/104.33

See application file for complete search history.

(56) References Cited

U.S. PATENT DOCUMENTS

| | | | | |
|---|---|---|---|---|
| 1,538,698 A | | 5/1925 | Hall | |
| 3,134,119 A | | 5/1964 | Criscuolo | |
| 3,317,943 A | | 5/1967 | Primm | |
| 6,009,588 A | * | 1/2000 | Rutkowski | B08B 9/045 15/104.33 |
| 6,421,871 B1 | | 7/2002 | Peach et al. | |
| 7,367,077 B2 | | 5/2008 | Rutkowski et al. | |

(Continued)

FOREIGN PATENT DOCUMENTS

| | | | | |
|---|---|---|---|---|
| CN | 1242265 A | | 1/2000 | |
| CN | 107030071 A | * | 8/2017 | B08B 9/045 |

(Continued)

OTHER PUBLICATIONS

English translation of CN 107030071 A, Li et al., Aug. 11, 2017. (Year: 2017).*

(Continued)

*Primary Examiner* — Laura C Guidotti

(74) *Attorney, Agent, or Firm* — Erik J. Overberger; Rankin, Hill & Clark LLP

(57) ABSTRACT

Drain cleaners are described that include rotatable drums which retain drain cleaning cable. Mounted on the rotatable drum is a motor and optional gearbox for imparting rotation to the drain cleaning cable. The drain cleaners can also include a cable clamp mounted on the rotatable drum. The drain cleaners are configured such that the rotatable drum is free of positional preference regardless of orientation of the drain cleaner.

19 Claims, 31 Drawing Sheets

(56) References Cited

U.S. PATENT DOCUMENTS

| | | | | |
|---|---|---|---|---|
| 8,646,143 | B2 | 2/2014 | Lokkinen et al. | |
| 9,265,263 | B2 | 2/2016 | Whited et al. | |
| 2005/0236917 | A1 | 10/2005 | Lui | |
| 2006/0243302 | A1 | 11/2006 | Mardero et al. | |
| 2008/0098544 | A1 | 5/2008 | Rutkowski et al. | |
| 2017/0268216 | A1 | 9/2017 | Cole et al. | |
| 2018/0085797 | A1 | 3/2018 | Beyer | |
| 2020/0238345 | A1 * | 7/2020 | Mavros | B08B 9/045 |

FOREIGN PATENT DOCUMENTS

| | | | | |
|---|---|---|---|---|
| CN | 209363184 | U | 9/2019 | |
| FI | 125579 | B * | 11/2015 | B08B 9/045 |
| GB | 2117078 | | 10/1983 | |
| JP | 2007 300 739 | | 11/2007 | |

OTHER PUBLICATIONS

Computer generated English translation of CN 107030071 A, Li et al., Aug. 11, 2017. (Year: 2017).*

CN Office Action dated Feb. 25, 2023; Application No. 202110190313.8; 10 pg.

"The Fundamentals of Mechanical Design", E. Zhang et al., p. 263-265, National Defense Industry Press, May 2014.

Picote Maxi Miller Power + Operator's Manual; https://www.picotesolutions.com/operating-manuals; Jan. 9, 2019; 23 pages.

Picote Maxi Miller Operator's Manual; https://www.picotesolutions.com/operating-manuals; Jan. 9, 2019; 20 pages.

Picote Super Midi Miller Operator's Manual; https://www.picotesolutions.com/operating-manuals; Jan. 9, 2019; 20 pages.

Picote Midi Miller Operator's Manual; https://www.picotesolutions.com/operating-manuals; Jan. 9, 2019; 17 pages.

Picote Mini Miller Operator's Manual; https://www.picotesolutions.com/operating-manuals; Jan. 9, 2019; 22 pages.

Picote Micro Miller Operator's Manual; https://www.picotesolutions.com/operating-manuals; Jan. 9, 2019; 22 pages.

RCM-10, RCM-25, RCM-36 Cleaning units product brochure; https://www.renssi.com/en/products/machines-and-equipment/rom-machines/; Mar. 18, 2019; 2 pages.

RCM-10 Safety and Instruction Manual; https://www.renssi.com/en/services/; Jan. 2019; 12 pages.

RCM-25 Safety and Instruction Manual; https://www.renssi.com/en/services/; Jan. 2018; 16 pages.

RCM-36 Safety and Instruction Manual; https://www.renssi.com/en/services/; Jan. 2018; 16 pages.

E Zhang, et al., Fundamentals of Mechanical Design 1st edition; May 31, 2014; National Defense Industry Press; 263-265; 5 pages.

CN Office Action and Search Report dated Jul. 20, 2022; Application No. 202110190313.8; 12 pages.

* cited by examiner

POWERED DRAIN CLEANER WITH FLEX SHAFT

CROSS REFERENCES TO RELATED APPLICATIONS

This application is a continuation-in-part (CIP) application and claims priority from U.S. nonprovisional application Ser. No. 16/420,383 filed on May 23, 2019, which claims priority upon U.S. provisional application Ser. No. 62/797,744 filed Jan. 28, 2019. This application also claims priority from U.S. provisional application Ser. No. 62/976,714 filed Feb. 14, 2020.

FIELD

The present subject matter relates to drain cleaning machines, systems, and equipment used in performing drain cleaning.

BACKGROUND

The drain cleaners of the present subject matter use a flexible cable enclosed within a non-rotating sheath. The cable and sheath typically are positioned inside a round channel of a drum. The drum rotates when cable is pulled out from the drum. To power these machines, an electric motor is typically used. The motor is either enclosed within the drain cleaner and rotates with the drum, or the motor is stationary and positioned outside the drum and drives the cable through multiple right-angle gear boxes.

Such drain cleaners are typically operated in a horizontal orientation, in which the drum rotates about a vertically oriented shaft. This enables the cable to stack neatly around the interior drum channel. In addition, for versions of the drain cleaners in which the motor is enclosed within the drain cleaner and rotates with the drum, the weight of the motor inhibits the drain cleaner from being operated in a vertical orientation, in which the drum rotates about a horizontally oriented shaft.

For a variety of reasons described herein, it would be beneficial for such a drain cleaner to be able to operate in a vertical orientation.

SUMMARY

The difficulties and drawbacks associated with previous approaches are addressed in the present subject matter as follows.

In one aspect, the present subject matter provides a drain cleaner comprising a housing defining an interior hollow region. The drain cleaner also comprises a rotatable drum disposed in the interior hollow region defined by the housing. The drum is rotatable about an axis of rotation. The drain cleaner also comprises an electric motor secured to the drum and rotatable with the drum. The drain cleaner also comprises a counterweight secured to the drum and rotatable with the drum.

In another aspect, the present subject matter provides a drain cleaner comprising a housing defining an interior hollow region. The drain cleaner also comprises a rotatable drum disposed in the interior hollow region defined by the housing. The drum is rotatable about an axis of rotation. The drain cleaner also comprises an electric motor secured to the drum and rotatable with the drum. The drain cleaner also comprises a cable clamp secured to the drum and rotatable with the drum. The cable clamp defines (i) a recessed cable passage region along an underside of the cable clamp and (ii) at least one heat transfer fin along an exterior of the cable clamp.

In yet another aspect, the present subject matter provides a drain cleaner comprising a housing defining an hollow interior region; a drum defining an interior surface and a channel in which a cable and sheath are disposed, wherein the drum is disposed in the housing and rotatable about a horizontally disposed axis; a motor removably secured to the interior surface of the drum at a first location; a gearbox removably secured to the interior surface of the drum at a second location spaced from the first location; and a counterweight secured to or formed along the interior surface of the drum at a third location spaced from the first and second locations. The motor or the gearbox or both the drum and the gearbox are located radially outwardly from the axis of rotation of the drum. The improvement comprises the third location being spaced from the axis of rotation so that the drum is balanced.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
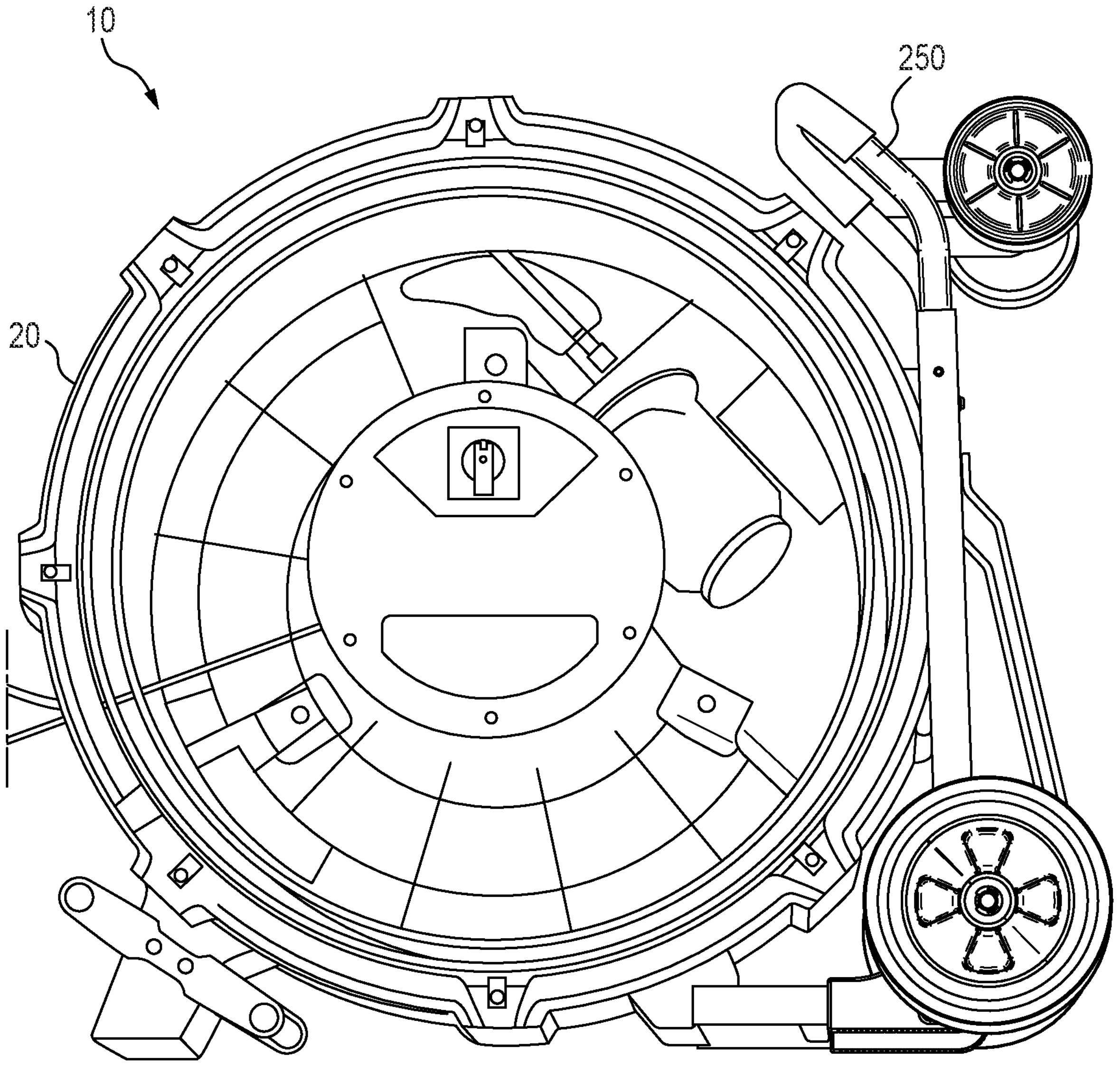
FIG. 1 is a perspective schematic view of an embodiment of a drain cleaner with a cover removed in association with an optional cart, in accordance with the present subject matter.

When cleaning drains, space is often limited. Large drain cleaning machines that must operate in a horizontal orientation, i.e., drum rotating around a vertical shaft, take up a significant amount of space. Also, for drain cleaning machines using an internal motor, the motor weight being in the drum presents issues for operation of the drain cleaner. For a vertically oriented drain cleaner, when the motor is located at the bottom of the drum rotation, the cable is very difficult to be pushed in or pulled out of the drain cleaner because the weight of the motor must be pulled up to the top of the drum rotation. Conversely, when the motor is located at the top of the drum rotation, cable can be forced out of the drum accidently or unintentionally when gravity causes the drum to rotate such that the motor is located at the bottom of the drum rotation. The present subject matter is directed to remedying these issues and enable a drain cleaner to be operated in a vertical orientation without these issues.

In many such drain cleaners, the motor and typically also a gearbox, are secured to or located on the drum which rotates as cable is being pulled out. In accordance with the present subject matter, since the motor/gearbox is located off center, i.e., located radially outward from an axis of rotation of the drum, a counterweight is added on an opposite side of the drum to counter the weight of the motor/gearbox. The counterweight is sized, shaped, and/or positioned so that when the drum is rotated, and typically when the axis of rotation is in a horizontal orientation, the force required to pull cable from the drum is the same regardless of the rotational or angular position of the drum. Also, in certain embodiments, the motor is mounted to the drum on a small incline or at a relatively small angle to promote a match or transition between a gearbox shaft and the cable. This feature avoids abrupt bends in the cable which typically lead to subsequent losses of strength in the cable. These aspects are described in greater detail herein.

As described herein, the present subject matter is directed to drain cleaners and their operation utilizing flex shaft cable. Details of these drain cleaning machines, their operation, and flex shaft cable are provided in the noted parent application, U.S. Ser. No. 16/420,383 filed May 23, 2019, hereby incorporated by reference in its entirety. The term “flex shaft” cable as used herein refers to a flexible shaft or flexible cable which may optionally include a sheathing. However, it will be understood that the present subject matter is not limited to flex shaft type drain cleaners, and encompasses other types of equipment. Although drain cleaners are known in which a cable is coiled inside a housing of the drain cleaner and the cable is rotated about its axis by a motor, such as described in U.S. Pat. No. 7,367,077, a need remains for an improved powered drain cleaner.

Additional aspects of drain cleaners in accordance with the present subject matter include, but are not limited to, the following.

Drum and Housing Support

The drain cleaners of the present subject matter include a drum or drum assembly, a support, and a drum housing. The drum housing can include one or more optional wheels. The drum assembly is rotatable about an axis of rotation, is rotatably supported by the support, and is generally enclosed within the drum housing. In many embodiments, the support includes a plurality of feet that extend through the drum housing so that during operation and rotation of the drum assembly within the drum housing, the drum housing does not support the weight of the rotating drum assembly. Also, when the drain cleaner is in a vertical orientation, the feet lift the wheels off the ground to prevent the drain cleaner from unintended rolling. In many embodiments or applications, the drain cleaner is used in association with a wheeled cart.

Counterweight

As previously described, the drain cleaners of the present subject matter utilize one or more counterweights secured to the rotatable drum assembly. In many embodiments, a single counterweight is used and is configured so that it is relatively light weight and fits into the drum assembly. As will be understood, in order to reduce the weight of the counterweight, it is selectively located and secured to a location on the drum assembly such that the moment of inertia of the weight of the counterweight with respect to the axis of rotation of the rotating drum is equal to the moment of inertia of corresponding components, for example the motor/gearbox and cable clamp, described in greater detail herein. In many embodiments, the counterweight also extends in an arcuate manner in order to promote balancing the cable clamp mass and mass of other components as described in greater detail herein.

In a particular embodiment, the counterweight includes at least one portion that extends along an arcuate axis. The counterweight is typically secured to the rotatable drum such that the arcuate axis of the at least one portion of the counterweight is concentrically oriented about the axis of rotation of the drum.

Figure 15:
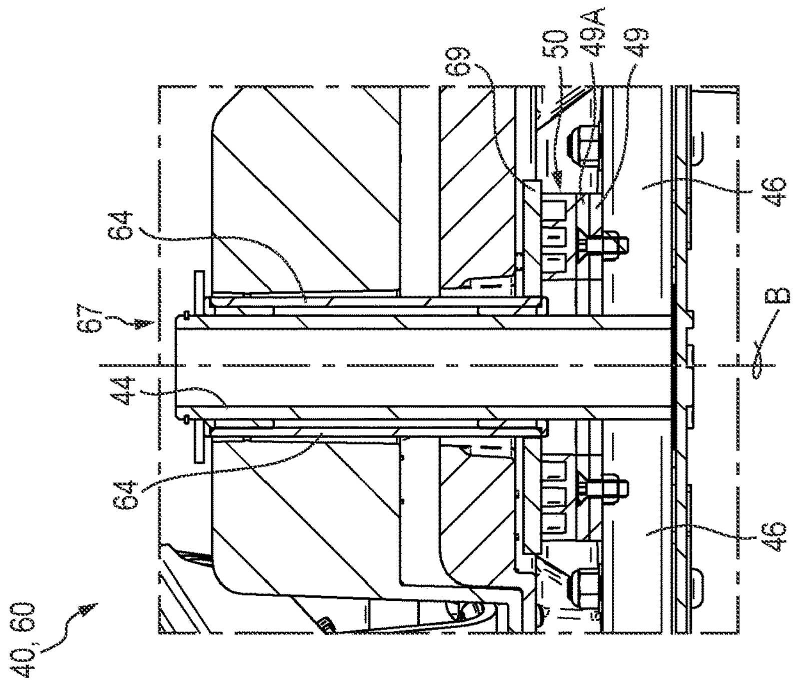
FIG. 15 is a partial sectional view of the drain cleaner of FIG. 14 illustrating in greater detail various bearings used in the drain cleaner.
Figure 14:
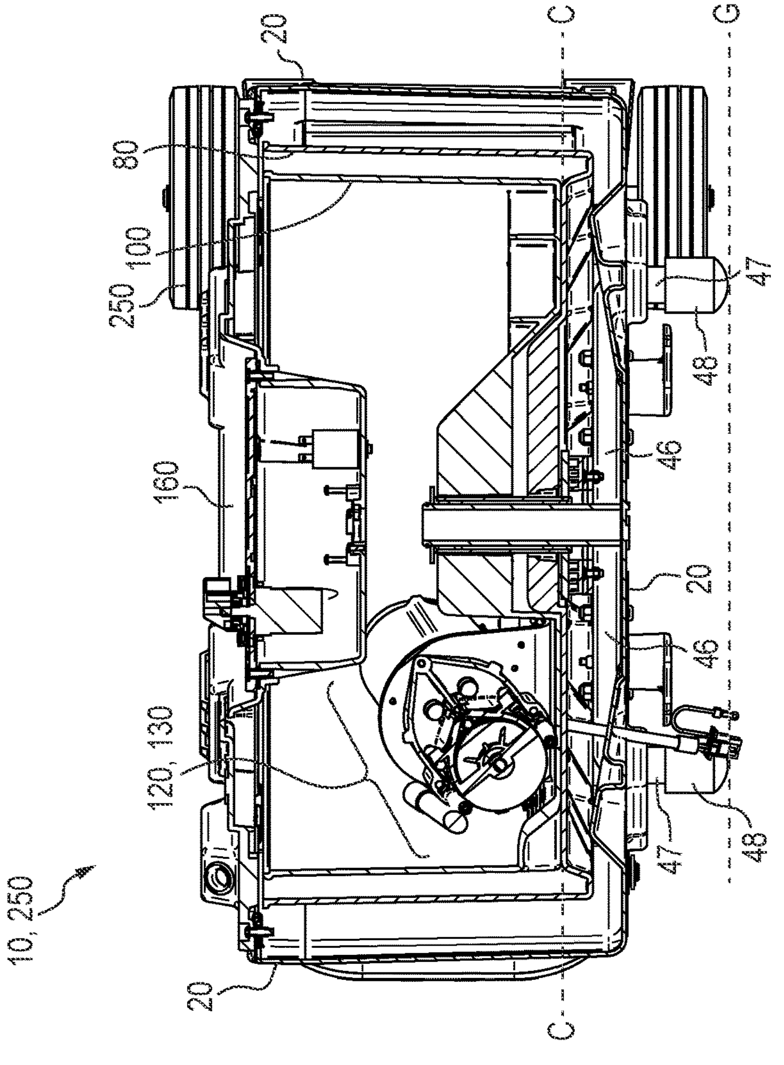
FIG. 14 is a cross sectional view of the drain cleaner taken across line IV-IV in FIG. 2 illustrating various components assembled within the interior of the drain cleaner.

As described herein, in certain embodiments of the drain cleaners of the present subject matter, the rotatable drum assembly does not exhibit any positional preference. That is, upon imparting rotational motion to the drum assembly and then removing or discontinuing the rotational power source, the drum freely rotates until stopping at a random rotational position, rather than a rotational position which is the result of uneven distribution of mass of the drum assembly about the axis of rotation of the drum. This characteristic is evident upon positioning the drain cleaner and drum assembly in a non-horizontal orientation and particularly evident when the drain cleaner and drum assembly are in a vertical orientation. FIGS. 2-5 illustrate the drain cleaner and drum assembly in a vertical orientation. FIGS. 14-15 illustrate the drain cleaner and drum assembly in a horizontal orientation. In many embodiments of the present subject matter, this characteristic is achieved by securing a configured counterweight to the drum assembly to counter balance any unequally distributed mass(es). In many embodiments, the counterweight is sized, shaped, and/or selectively located at a particular radial distance from the axis of rotation of the drum, to counter balance the drum assembly, i.e., the drum and other components secured thereto.

Cable Clamp

In many embodiments, the drain cleaners of the present subject matter include a cable clamp secured to the rotatable drum assembly. The cable clamp promotes easy coupling and decoupling between the gearbox and the cable. Further, once the cable is disconnected from the gearbox, the cable may be axially moved to disengage and remove from the drum assembly. In many versions, the cable clamp is configured to also function as a heat sink since portions of the cable in a bent or arcuate region typically located alongside or near the cable clamp, generate a relatively large amount of heat. Sight holes in the cable clamp enable viewing the location and condition of the sheath in the bent or arcuate region.

The drain cleaners of the present subject matter utilize at least one cable clamp to secure at least a portion of the flexible cable to the rotatable drum assembly. The cable clamp is typically secured to the drum assembly by a plurality of fasteners such as for example threaded fasteners. However, the present subject matter includes securing the cable clamp to the drum assembly by other means. The cable clamp generally defines a recessed cable passage region along its underside, and one or more heat transfer fins along its exterior regions.

In many embodiments of the present subject matter, the cable clamp extends closer to an annular channel within the drum than the embodiment shown in the noted parent application, U.S. Ser. No. 16/420,383. In many embodiments, the cable clamp only contacts the cable sheathing at spaced apart arches along the cable while the drum surface is flat and sloped towards the base of the annular channel. In many embodiments, the arches extend further away from the cable so as to provide cooling fins or ribs for cooling the cable clamp and cable. In many embodiments, it is relatively easy to either replace the cable clamp or to utilize a differently sized cable clamp for different sized cable, for example a ⅜ inch vs. a ½ inch cable.

In certain embodiments of the drain cleaners of the present subject matter, the cable clamp includes at least one, and typically a plurality of heat transfer fins. Generally, the heat transfer fins are located along one or more exterior or peripheral regions of the cable clamp and serve to dissipate heat typically transmitted from the underside of the cable clamp, and often from flexible cable extending within a passage defined along the underside of the cable clamp. In order to further promote heat transfer from the cable clamp and its fins to the environment, the material of the cable clamp is selected to exhibit a relatively high thermal conductivity k of at least 10 W/m·k, preferably at least 50 W/m·k, and particularly at least 100 W/m·k. A non-limiting example of a preferred material for the cable clamp is aluminum or its alloys which typically exhibit a thermal conductivity of at least 50 W/m·k. However, it will be understood that the cable clamps of the present subject matter can be formed from a wide array of other materials.

Support Plates

In many embodiments, one or more support plates and typically a plurality of support plates are provided along an exterior region of the drum housing. The support plates typically increase rigidity of the drum housing and can also be used in place of nuts or other threaded fasteners to secure heavier or loaded components.

Since the drum housing is typically formed from plastic, the support plates distribute forces or other loads to prevent the plastic from fracturing or breaking during operation, or from impact or dropping of the unit.

In many versions, the support plates are formed from metal or other materials which exhibit relatively high strength and/or durability. This enables other components to be affixed to a stronger material than the plastic drum housing.

As described in greater detail herein, motor mount support plates and cable clamp support plates can be configured to match up with orientation pins/protrusions in the drum assembly and respective components can be secured to the drum assembly with threaded fastener(s), such as screws. In certain versions, the motor mount support plate includes threaded apertures for receiving threaded fasteners to secure the motor to the drum assembly.

Provisions for Using Multi-Sized Cables

The drain cleaners of the present subject matter can include provisions that facilitate the use of different sized flexible cables with the drain cleaner(s). These provisions include cable clamps which can be replaced with other cable clamps sized and configured for a particular flexible cable. These provisions also include spacer(s) or shim(s) that can be positioned between the motor or other components and the drum assembly for accommodating larger diameter cables.

Journal Bearings

The use of journal bearings with the drum assembly allow for the drain cleaners of the present subject matter to operate in the vertical position. In many embodiments, there are two journal bearings that each include a shoulder for axial loading in addition to radial loads which they accommodate. Each journal bearing can be made of bronze, for example, or other acceptable material. In many embodiments, the journal bearings are mounted within a bearing housing that is mounted to the drum assembly. The bearing housing accepts a shaft attached to the housing. The shaft is secured within an annular protrusion with a retainer ring at the distal end of the shaft, and may also include a thrust washer captured between the journal bearing and the retainer ring. These aspects are described in greater detail herein.

Thrust Bearings

In many embodiments, a thrust bearing is positioned proximate a bearing housing near the center of the drum assembly and allows the drain cleaner to operate in a horizontal position. In many embodiments, the thrust bearing is removable and therefore, replaceable. The thrust bearing can be attached using threaded fasteners. In many embodiments, the thrust bearing rides against a thrust surface provided by the drum housing. These aspects are described in greater detail herein.

Telescoping Handle

In many embodiments, the cart associated with the drain cleaners includes a telescoping handle. In certain versions, the handle of the cart includes spring loaded pins that engage both a frame tube and a handle tube. The handle can also utilize a catch pin that engages if the pins are pulled passed the handle holes. These aspects are described in greater detail herein.

Drain Cleaner Embodiments

Figure 3:
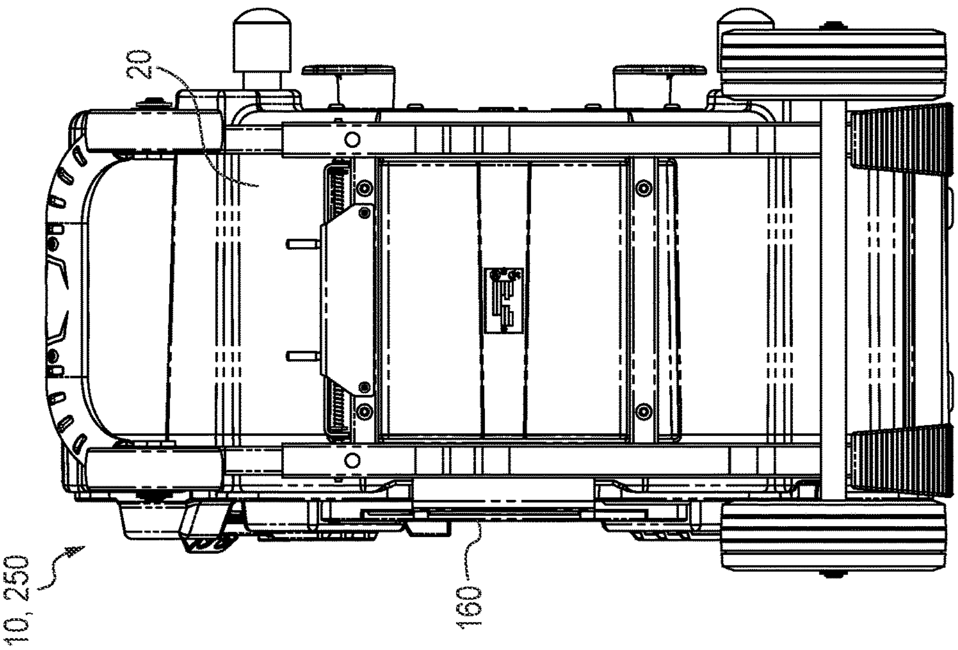
FIG. 3 is another elevational view of the drain cleaner of FIG. 2.
Figure 2:
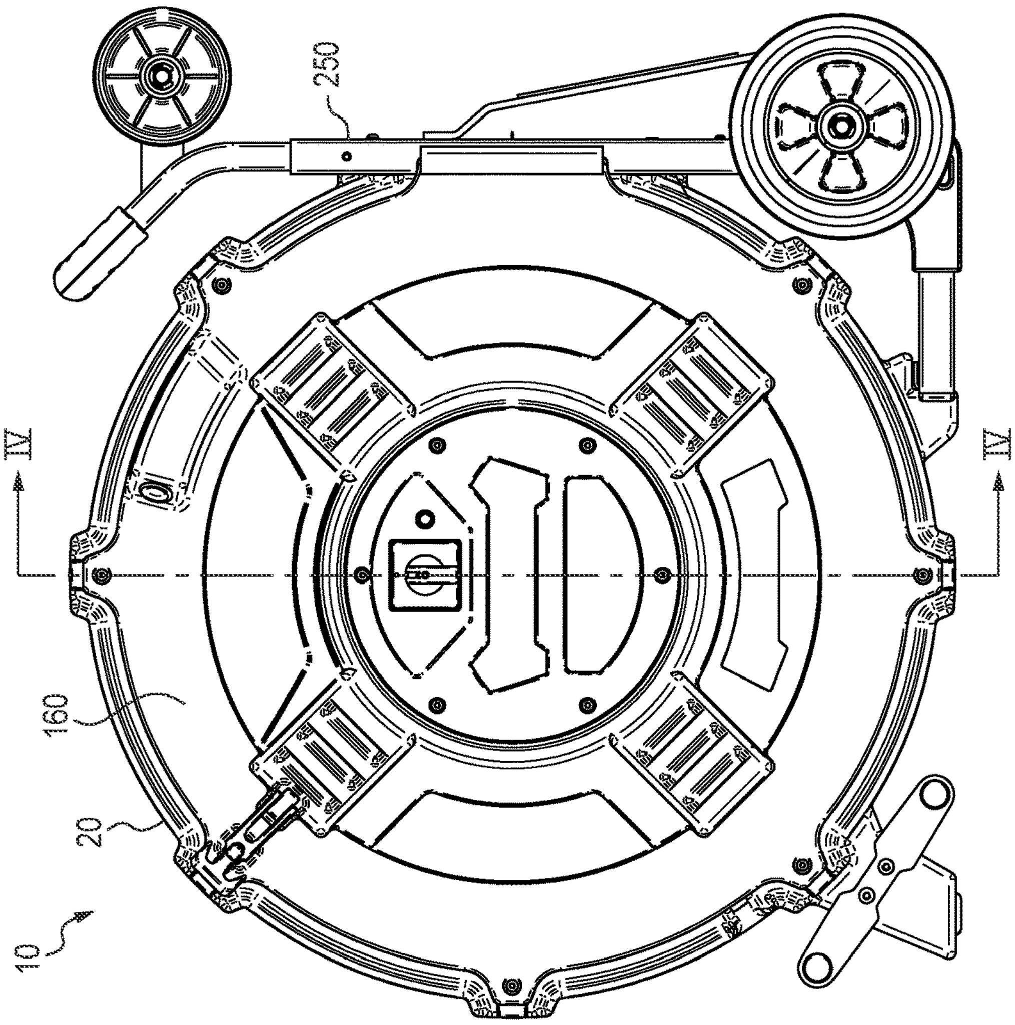
FIG. 2 is an elevational view of the drain cleaner of FIG. 1 with its cover attached.
Figure 5:
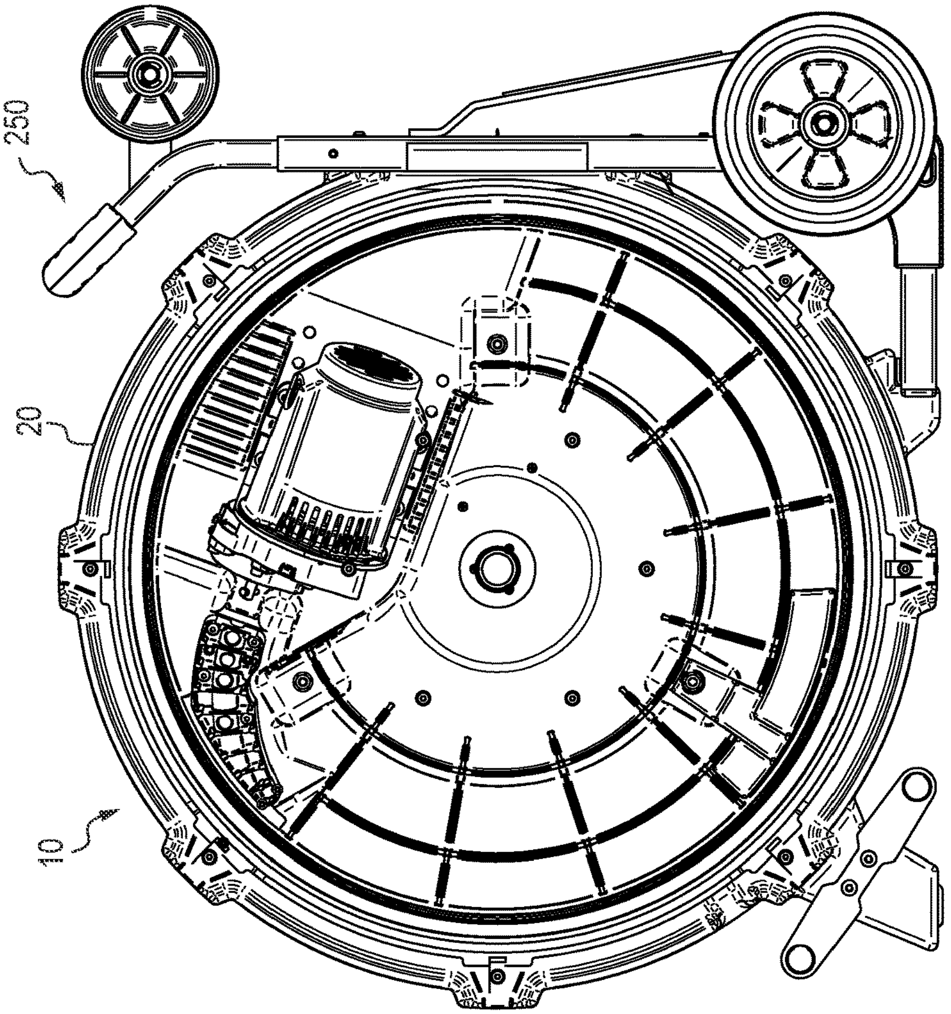
FIG. 5 is another elevational view of the drain cleaner of FIG. 1 with its cover removed and illustrating additional details.
Figure 4:
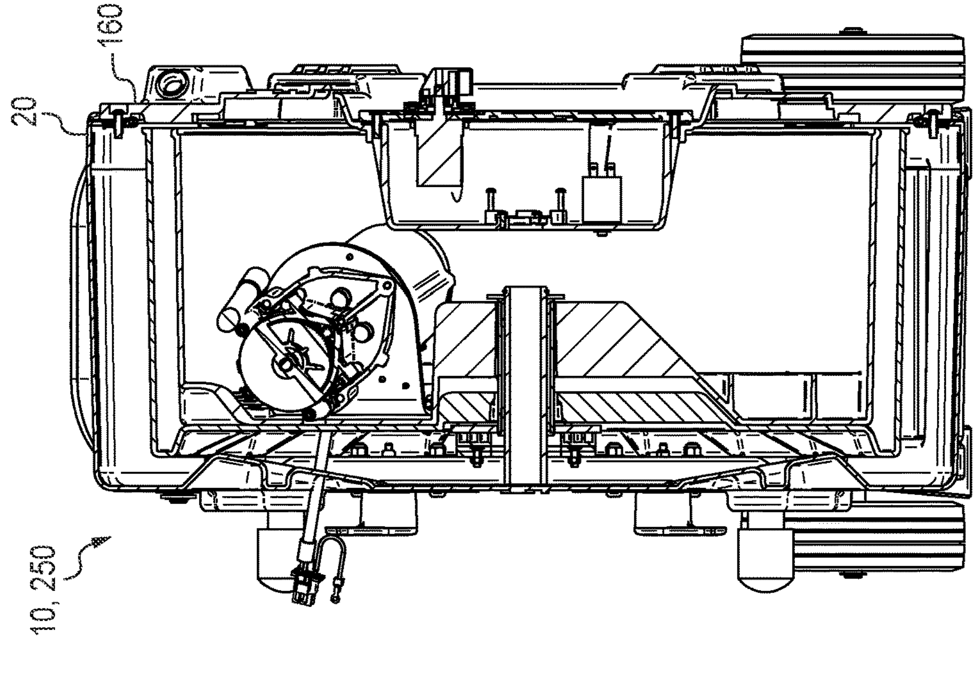
FIG. 4 is a cross sectional view of the drain cleaner taken across line IV-IV in FIG. 2.

FIGS. 1-5 illustrate an embodiment of a drain cleaner 10 in accordance with the present subject matter. The drain cleaner 10 is shown in a vertical orientation with an optional cart 250. The drain cleaner 10 is selectively attachable, detachable, and/or releasable from the cart 250. The cart 250 includes at least one wheel and typically utilizes two or four wheels. The cart 250 could further include six wheels (not shown) wherein an additional pair of wheels could be attached to opposite sides of an outwardly projecting support 23A (FIG. 6I). The drain cleaner 10 comprises a drum housing 20 and a housing cover 160. According to the present disclosure, the drum housing 20 is generally cylindrical. And the housing cover 160 is secured to the drum housing 20 to thereby enclose a hollow interior region of the drum housing 20. FIGS. 1 and 5 illustrate the housing cover 160 removed to thereby reveal the interior region of the drum housing 20. FIGS. 2-4 show the housing cover 160 attached to the drum housing 20.

Figure 6A:
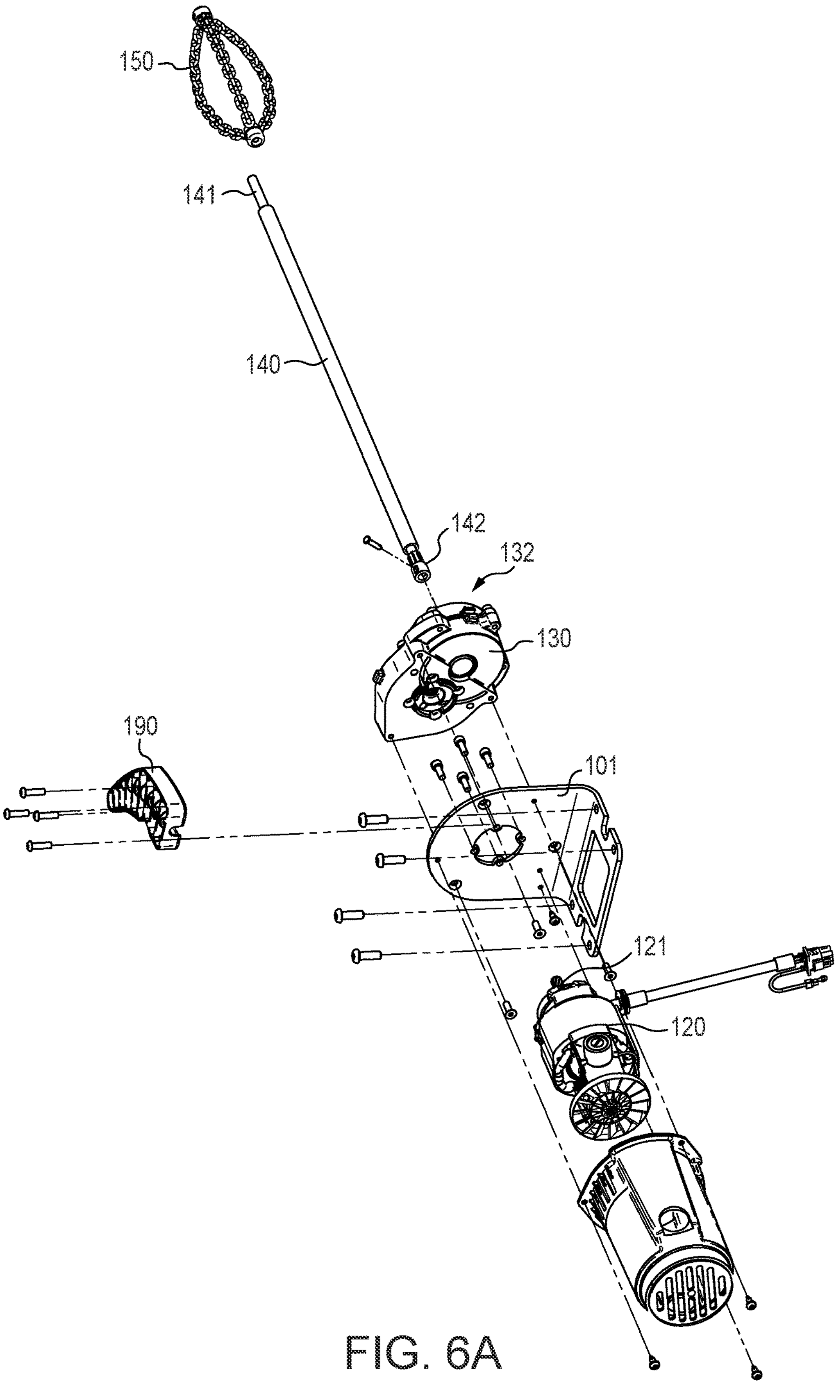
FIGS. 6A-6J are exploded assembly views of the drain cleaner and cart of FIG. 2.
Figure 6B:
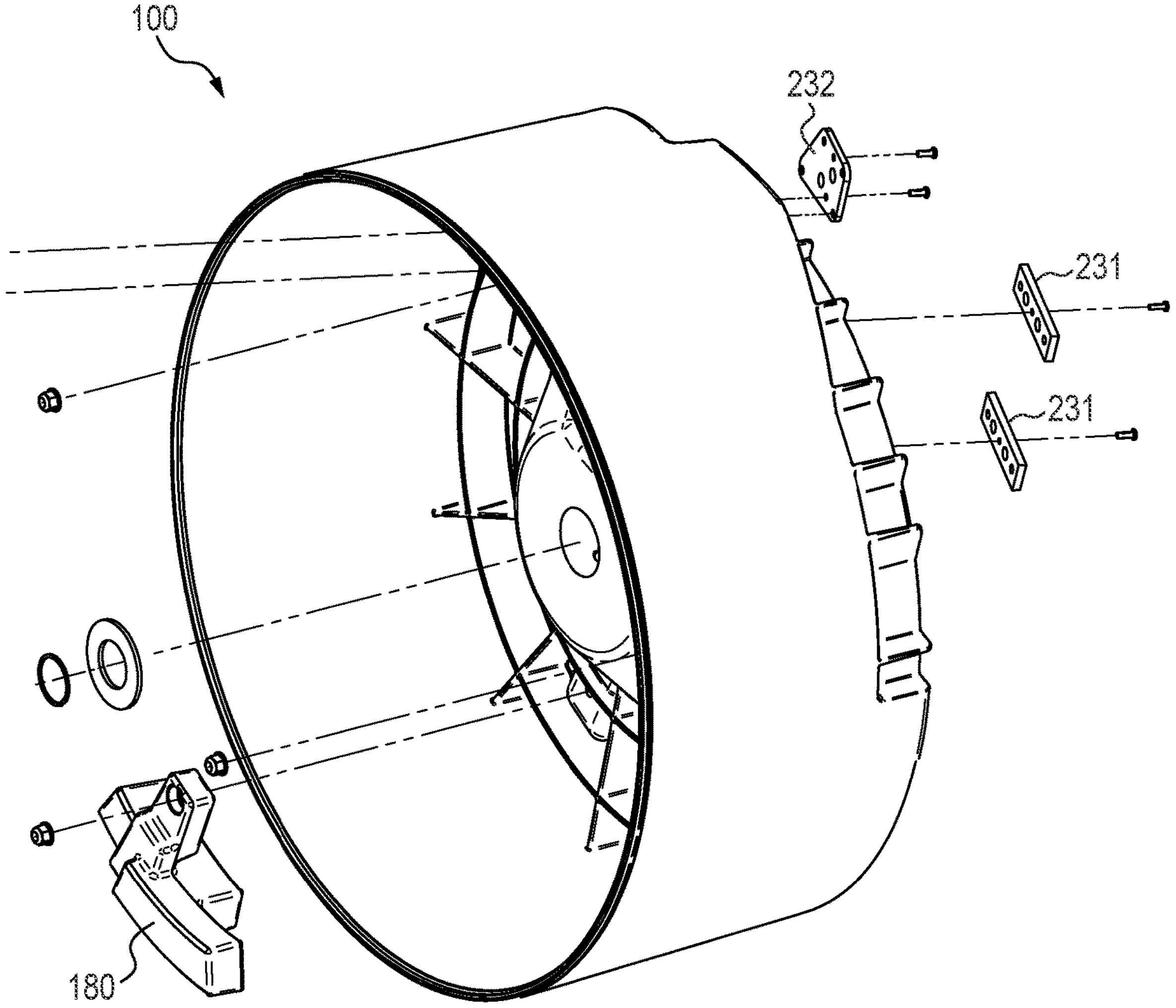
Figure 6C:
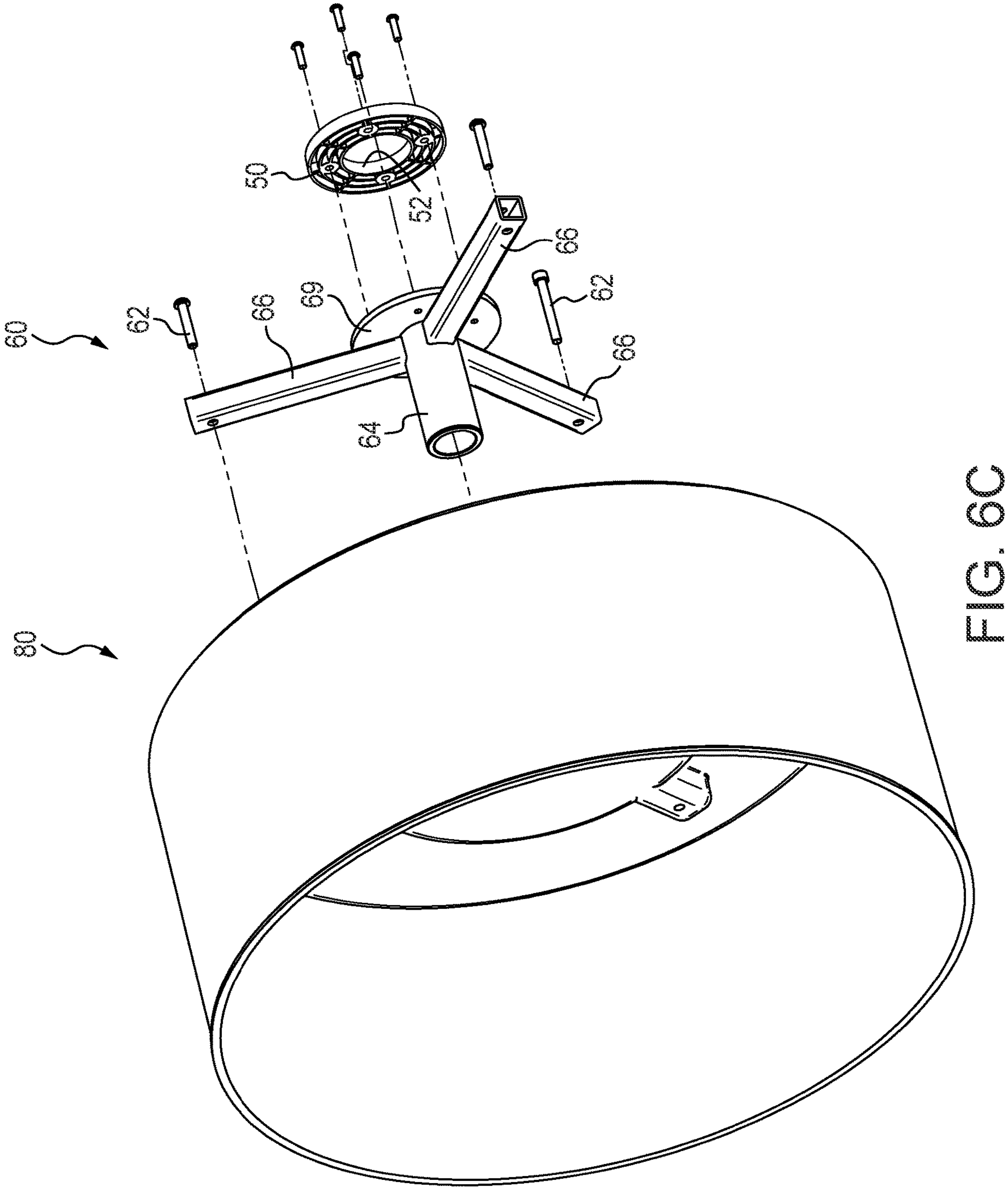
Figure 6D:
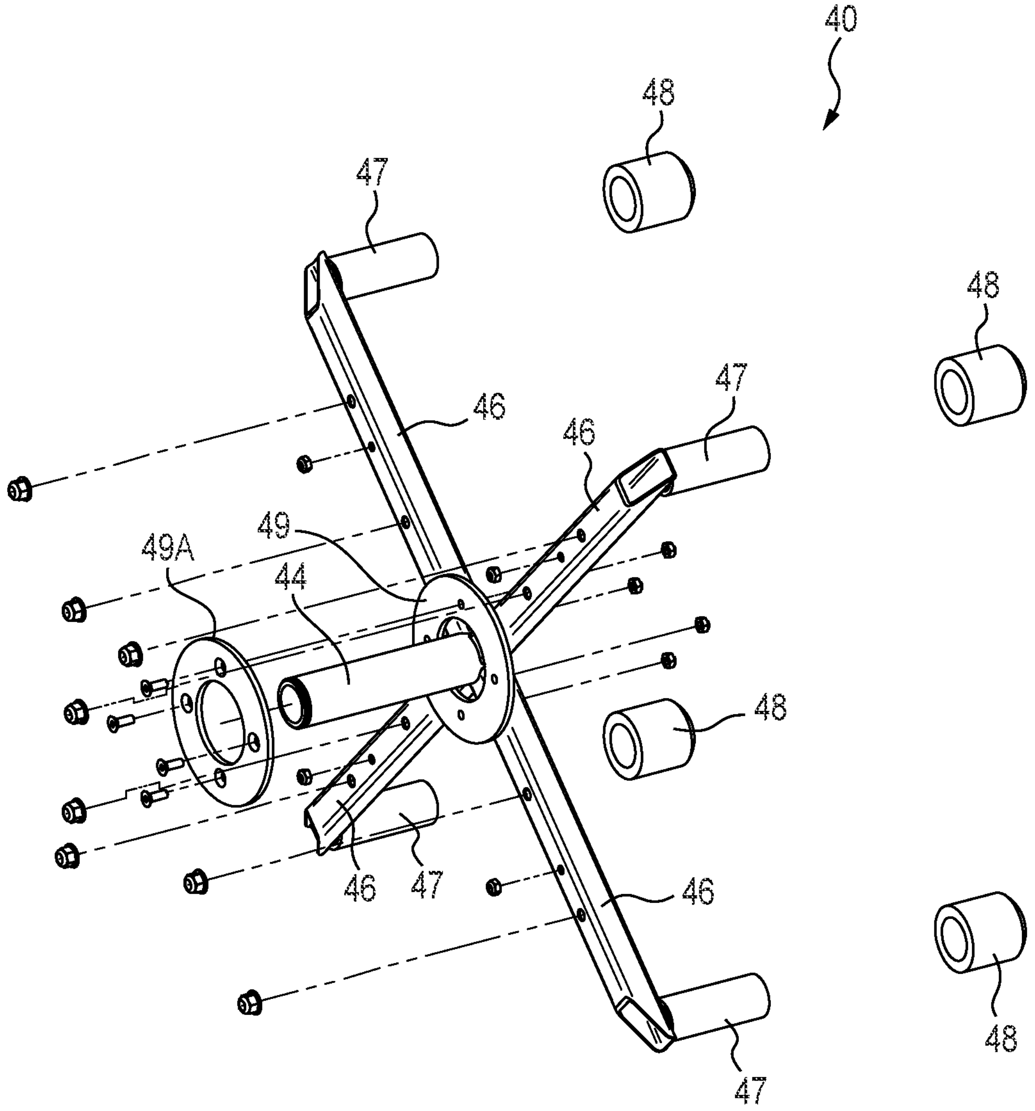
Figure 6E:
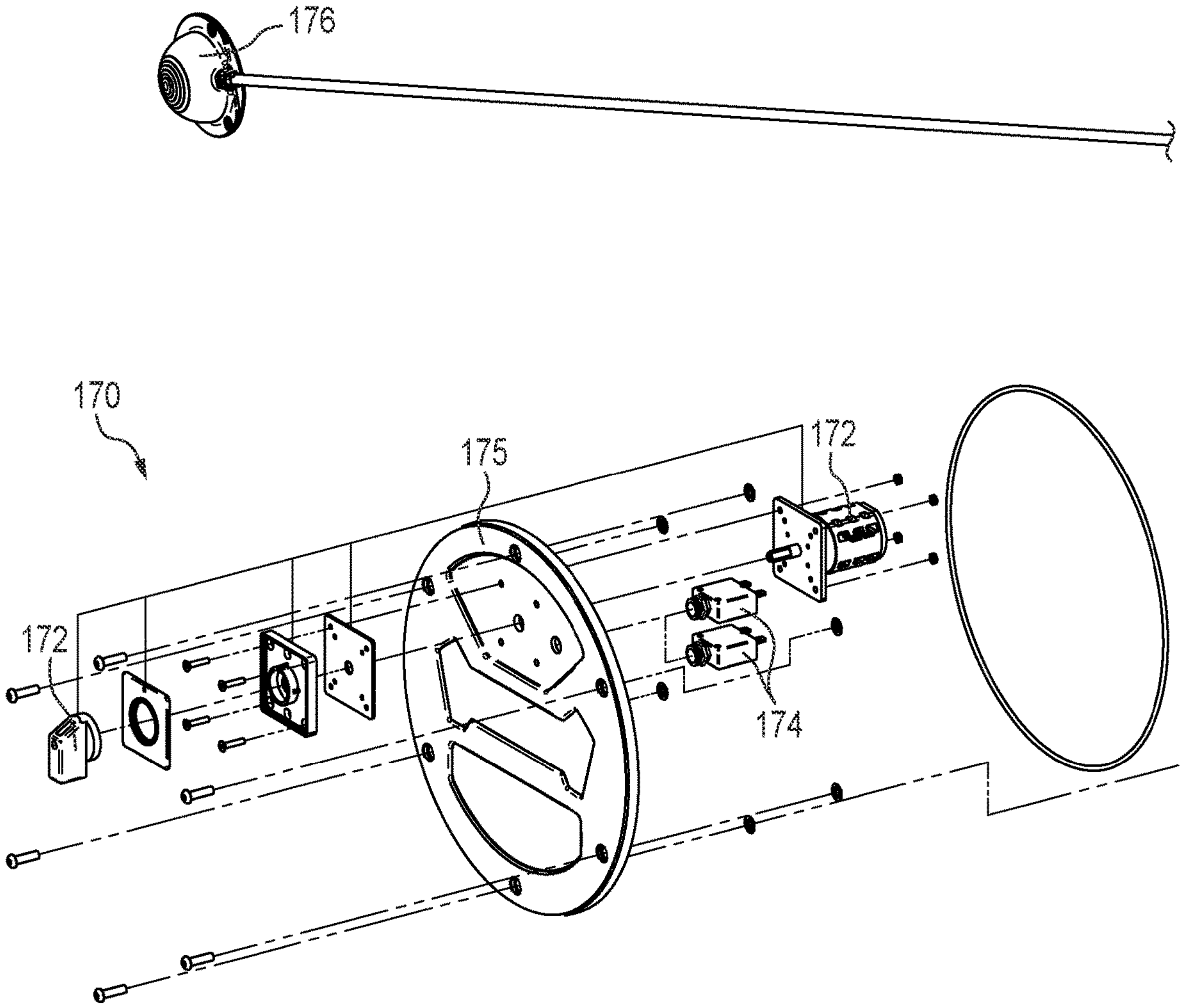
Figure 6F:
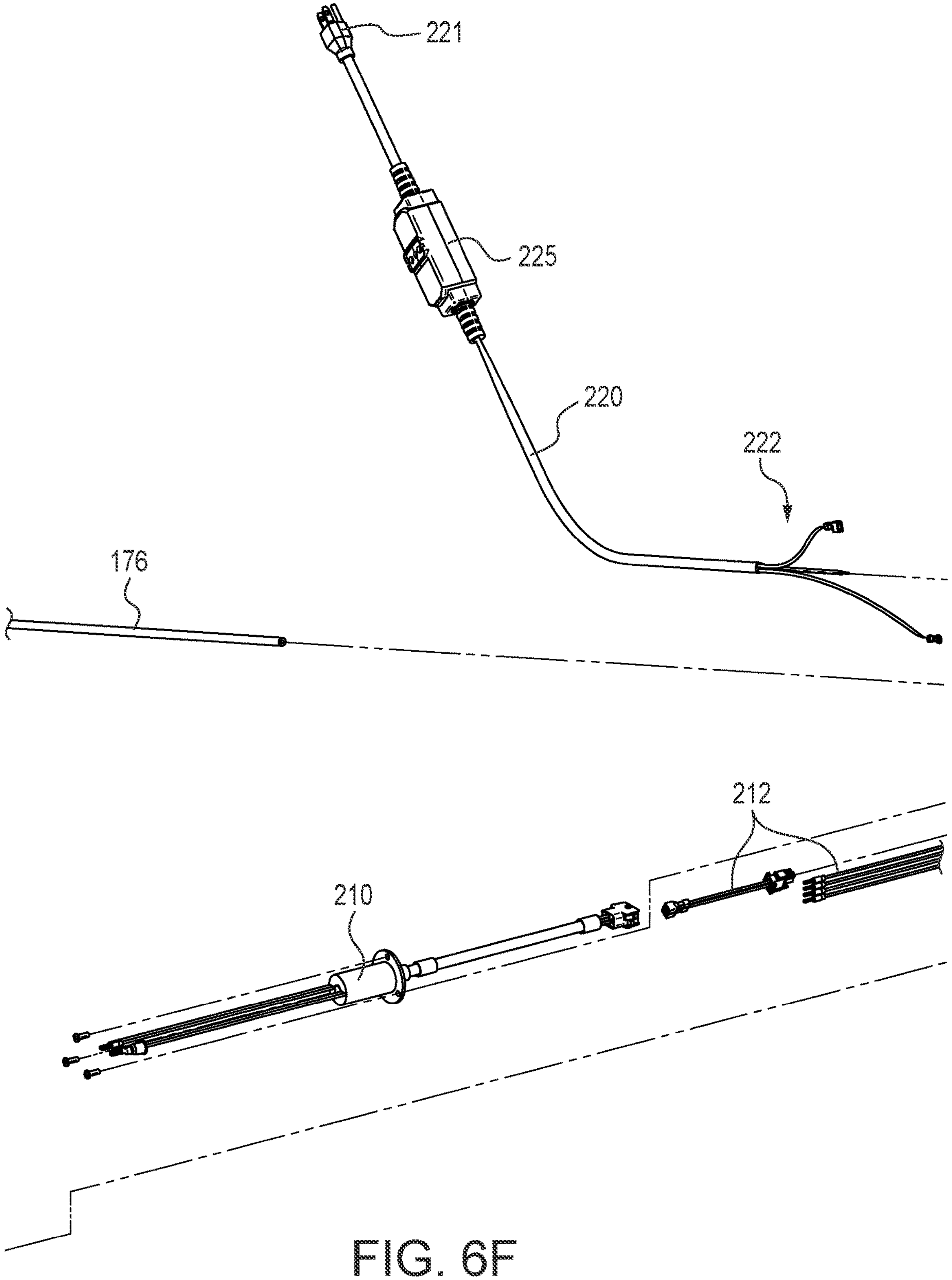
Figure 6G:
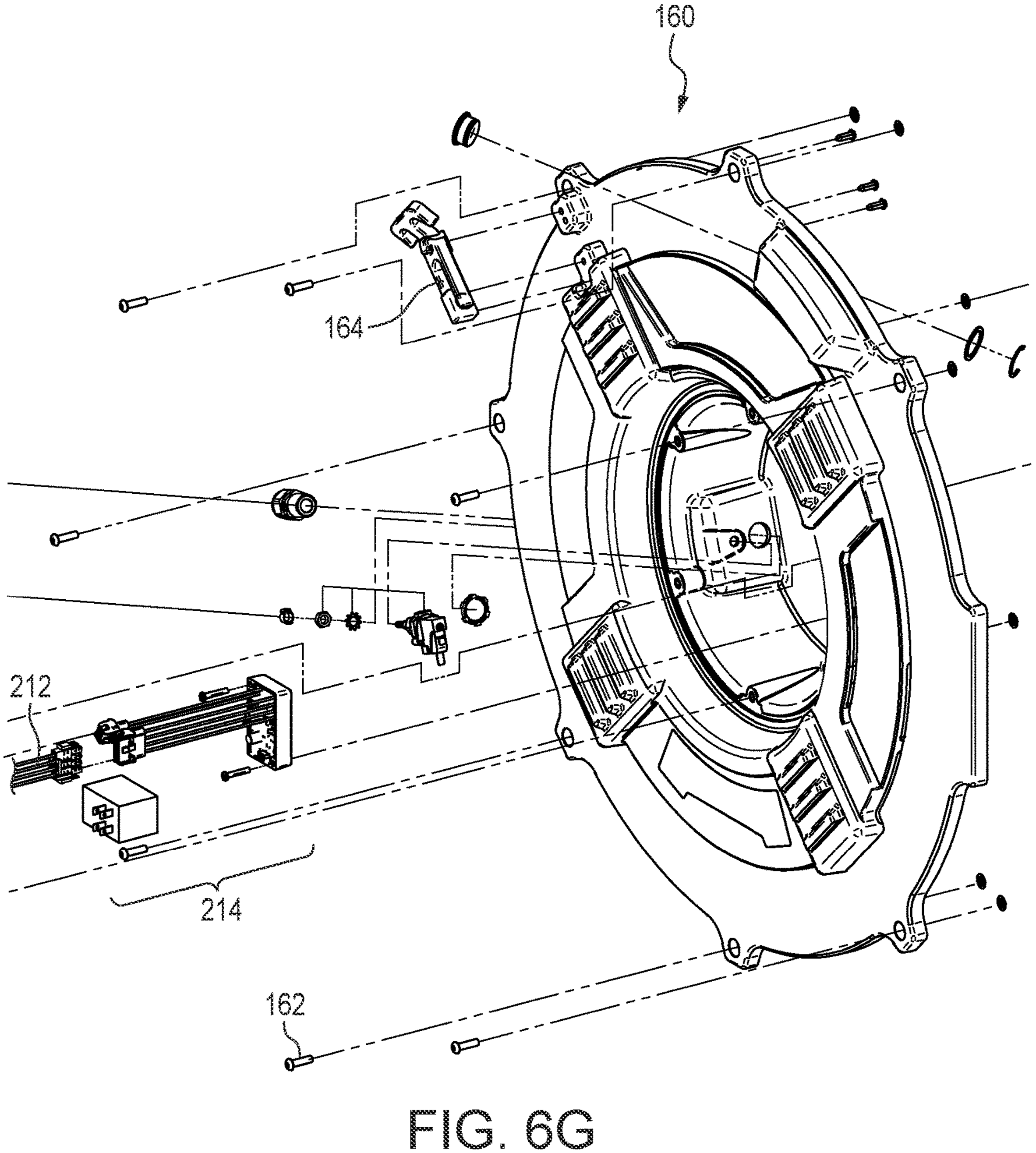
Figure 6H:
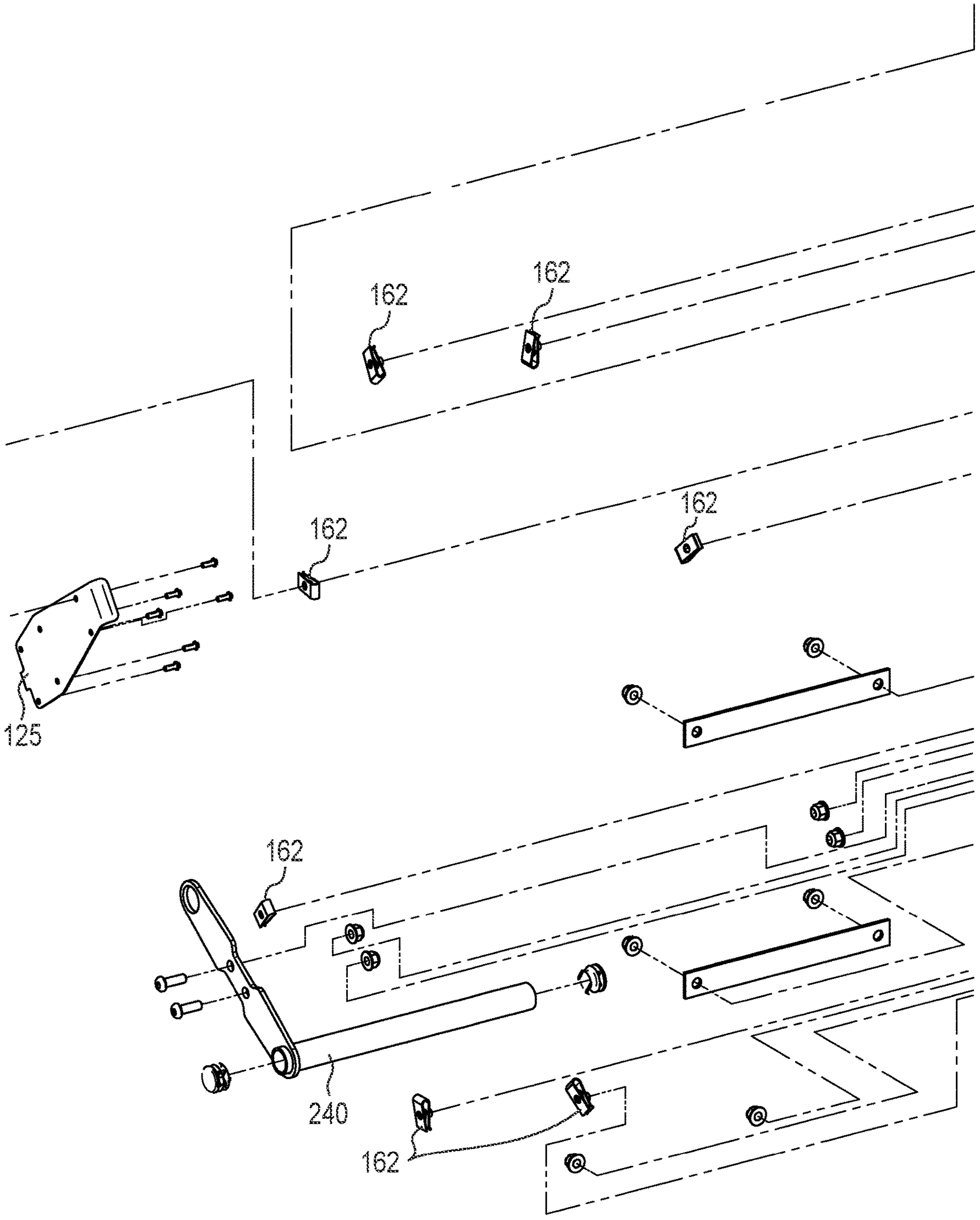
Figure 6I:
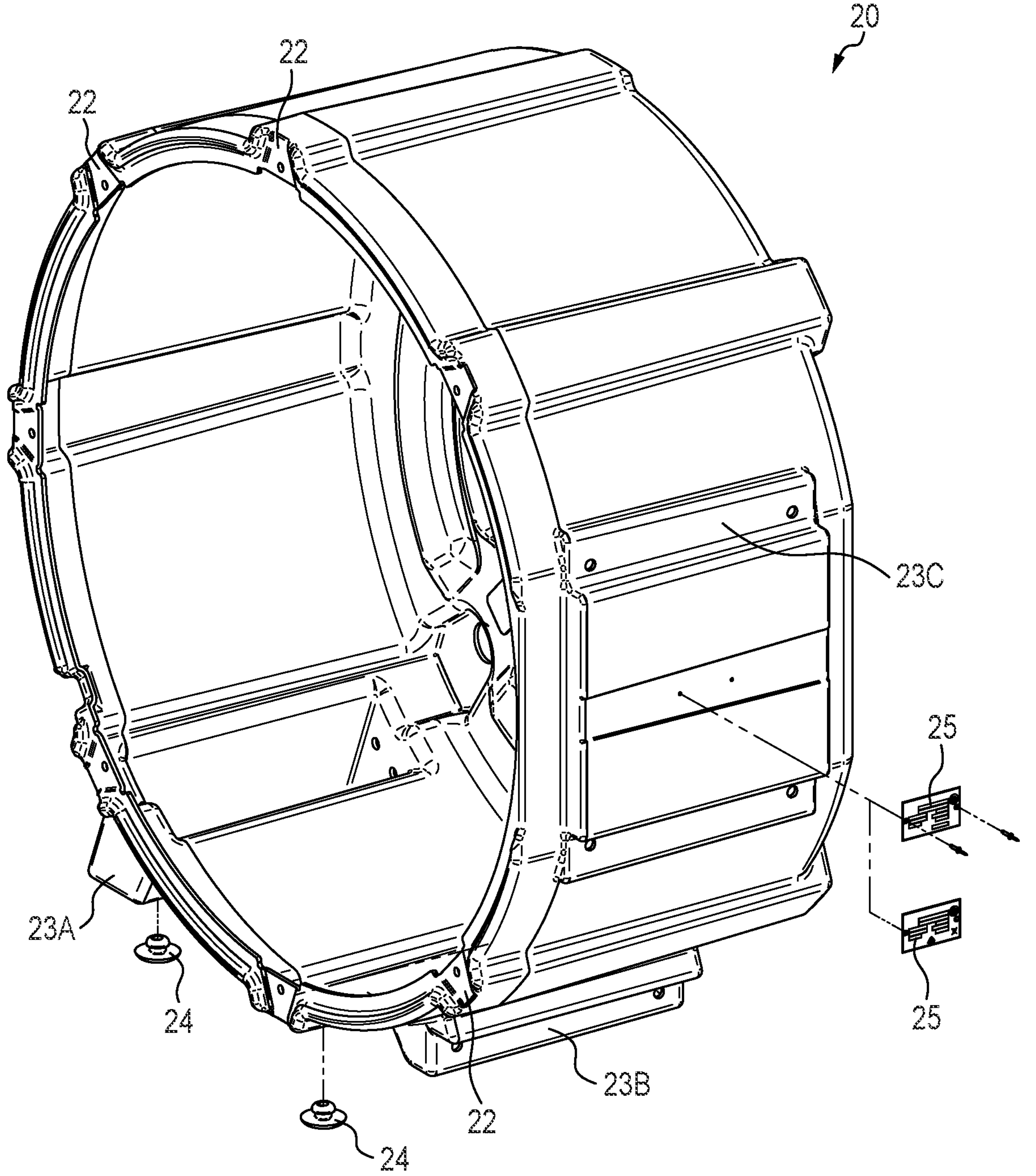

FIGS. 6A-6J are exploded assembly views of the drain cleaner 10. Generally, the drain cleaner 10 comprises a drum housing 20 (FIG. 6I), and a rotatable drum assembly which includes an outer drum 80 (FIG. 6C) and an inner drum 100 (FIG. 6B). The drain cleaner 10 also comprises an electric motor 120 (FIG. 6A) secured to the drum assembly and particularly the inner drum 100. In certain versions, the drain cleaner 10 additionally comprises a counterweight 180 (FIG. 6B) secured to the drum assembly and particularly the inner drum 100. Furthermore, in certain versions the drain cleaner 10 also comprises a cable clamp 190 (FIG. 6A) secured to the drum assembly and particularly the inner drum 100. Typically, the drain cleaner 10 comprises both the counterweight 180 and the cable clamp 190 secured to the drum assembly and particularly the inner drum 100.

Referring further to FIGS. 6B-6C, the drum assembly includes the outer drum 80 and the inner drum 100. Typically, the outer drum 80 is cylindrically shaped, and the inner drum 100 is also cylindrically shaped. The inner drum 100 is concentrically positioned within the outer drum 80 and secured thereto, thereby creating an annular channel extending between the outer drum 80 and the inner drum 100. The drum assembly, i.e., including the outer drum 80 and the inner drum 100, is disposed within an interior hollow region defined by the drum housing 20 (FIG. 6I). In another aspect, the inner drum 100 could be integrally formed with the outer drum 80. The drum housing 20 is also typically cylindrically shaped or generally so. However, in many versions, the drum housing 20 can include one or more strengthening ribs or regions at various locations. A housing cover 160 (FIG. 6G) is releasably attached to the drum housing 20.

The drain cleaner 10 also comprises a primary drum support assembly 40 (FIG. 6D), a secondary drum support assembly 60 (FIG. 6C), and a thrust bearing 50 (FIG. 6D) disposed between the primary and secondary support assemblies 40, 60. The secondary drum support assembly 60 is secured to the outer drum 80. Typically, one or more fasteners 62 are used. The secondary drum support assembly 60 includes a central receiving member 64, a plurality of outwardly extending leg members 66, and a thrust plate 69. The primary drum support assembly 40 includes a central support member or shaft 44, a plurality of outwardly extending leg members 46, a thrust support plate 49 and a thrust bearing plate 49A. As will be further understood by reference to FIGS. 6C and 6D, the central receiving member 64 of the secondary drum support assembly 60 is sized and shaped to receive the central support member or shaft 44 of the primary drum support assembly 40. And the thrust bearing 50 defines a receiving aperture 52 sized to accommodate the central support member or shaft 44 of the primary drum support assembly 40. Upon assembly of the components shown in FIGS. 6C and 6D, the outer drum 80 is rotatably supported on or via the primary drum support assembly 40. In certain versions, each of the leg members 46 of the primary drum support assembly 40 include a corresponding foot member 47 and optional shoe member 48.

Referring to FIG. 6A, the drain cleaner 10 additionally comprises a gearbox 130 in engagement with a rotary output 121 of the motor 120. FIG. 6A illustrates a portion of a flexible drain cleaning cable 140 having a cleaning head 150 at a distal end 141 of the cable 140. The flexible drain cleaning cable 140 also defines a proximal end 142 which is coupled to an output 132 of the gearbox 130. The gearbox 130 and/or the motor 120 are secured to the drum assembly and particularly to the inner drum 100 by one or more mounting brackets 101. As described in greater detail herein, a cable clamp 190 (FIG. 6A) is positioned over at least a region or portion of the drain cleaning cable 140. While the present disclosure describes a flexible drain cleaning cable, other types of drain cleaning cables could be utilized. In certain versions, an alternate coupling is used between the proximal end 142 of the drain cleaning cable 140 and the output 132 of the gearbox 130. This alternate coupling is longer in length than that depicted in FIG. 6A. In such versions, the location of the motor 120 is changed to accommodate the alternate coupling.

The drain cleaner 10 may optionally comprise various controls and/or indicators collectively depicted as 170 in FIG. 6E. Specifically, the controls and indicators 170 can include one or more selector switches 172 and electrical circuit breakers 174. The controls and indicators 170 typically also include a faceplate 175 which is secured to the housing cover 160 (FIG. 6G). The drain cleaner 10 may also optionally include a foot operated switch 176 for governing operation of the drain cleaner 10.

Referring to FIGS. 6F and 6G, the drain cleaner 10 also comprises provisions for signal and/or power delivery between the housing cover 160 and the rotatable drum assembly and particularly the inner drum 100. As will be understood, the housing cover 160 and the drum housing 20 are stationary and generally enclose the drum assembly and components attached thereto, i.e., the inner and outer drums 80, 100 and the motor 120. These provisions depicted in FIGS. 6F and 6G include a ring and slip capsule assembly 210 and one or more harness assemblies 212. One or more electronic controls and/or other accessories associated with the controls and indicators 170, and/or the motor 120 can be included, generally depicted in FIG. 6G as components 214. The drain cleaner 10 also comprises a power cord assembly 220 (FIG. 6F) having a plug 221, an opposite proximal end 222 for connecting to the controls 170, and/or the motor 120. The power cord assembly 220 also includes one or more switches, ground fault circuit interrupter (GFCI), and/or the components collectively referenced as item 225.

Referring further to FIGS. 6G-6I, the housing cover 160 is secured to the drum housing 20 by one or more fasteners 162. Each fastener 162 is affixed to a capture region 22 defined along a periphery of the drum 20. A latch 164 selectively secures the cable 140 and the cleaning head 150 against the housing cover 160. FIG. 6H also depicts a portion of a handle or handle assembly 240 described in greater detail herein. FIG. 6H also illustrates a guide plate 125 to create a channel and protect electrical wires or hoses from the rotating outer and inner drums 80, 100 and allow passage between the guide plate 125 and the housing cover 160 of the drum housing 20.

Referring further to FIG. 6I, the drum housing 20 can additionally include one or more outwardly projecting supports 23A, 23B, and 23C for example. The supports 23A-

23C are configured to support and stabilize the drum housing 20 when the drain cleaner 10 is operated in a vertical orientation, in which the drum assembly rotates about a horizontally oriented shaft or axis of rotation. One or more optional feet grommets 24 can be located along an underside of the support 23A. One or more nameplates 25 or other indicia can be provided, typically secured to an external surface of the drum housing 20. Supports 23B, 23C are secured to the cart 250 for providing additional support while in the vertical orientation.

Figure 6J:
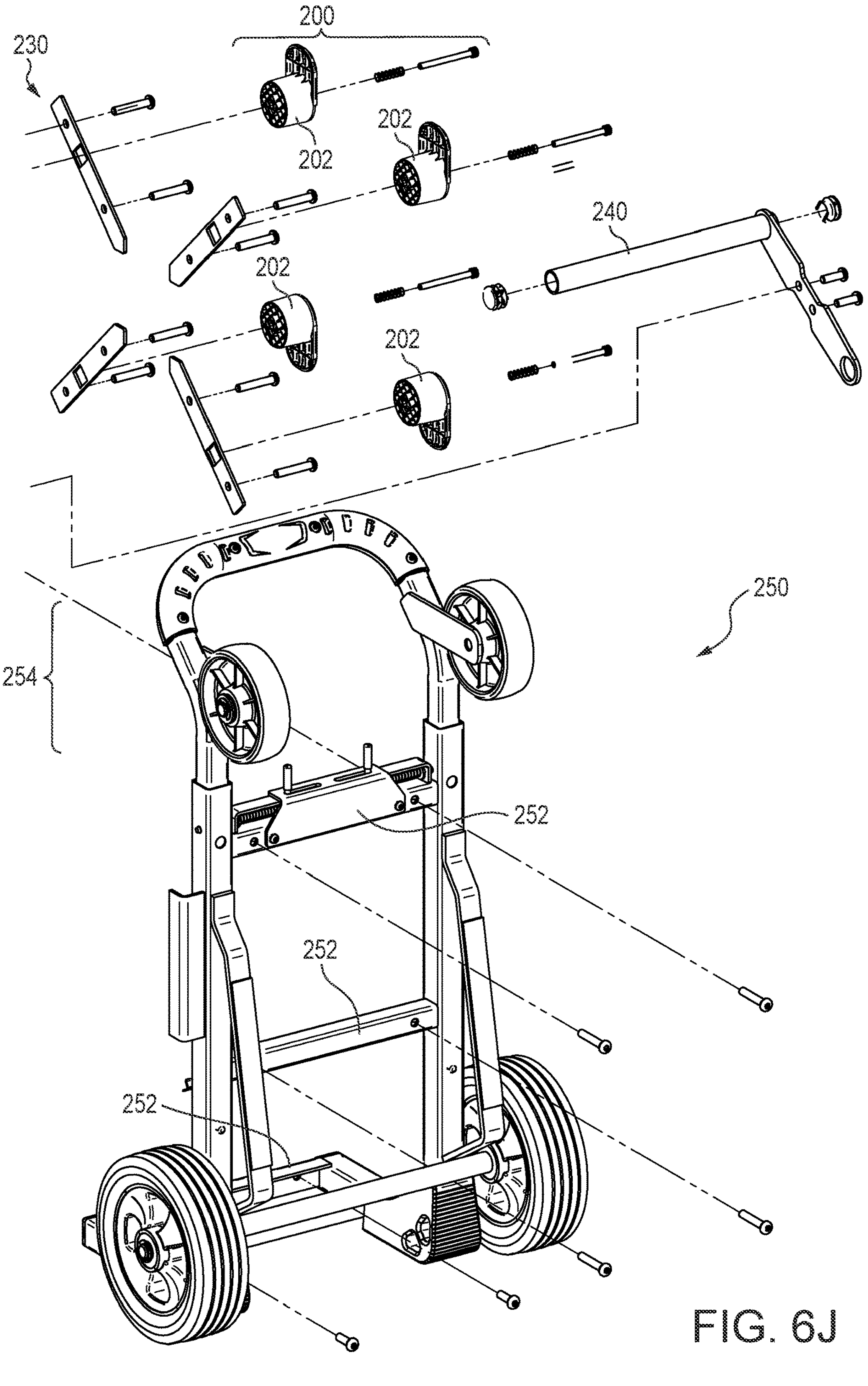

FIG. 6J also illustrates an optional cord wrap assembly 200 which can be located along an external region of the drum housing 20. FIG. 6J also shows a plurality of support plates 230 described in greater detail herein. FIG. 6J also shows a portion of the previously noted handle assembly 240. The cord wrap assembly 200 includes a plurality of cord wrap components 202, described in greater detail herein. FIG. 6J also shows the optional cart 250 which can be used with the drain cleaner 10. The cart 250 can include one or more engagement regions 252 for selective affixment with the drain cleaner 10 and in particular to the drum housing 20. In certain versions, and as shown in FIG. 6I, the drum housing 20 includes one or more mounting regions 23 for receiving and/or contacting an engagement region(s) 252 of the cart 250. As previously noted, the cart 250 can include a telescoping handle assembly generally shown as item 254.

Figure 7:
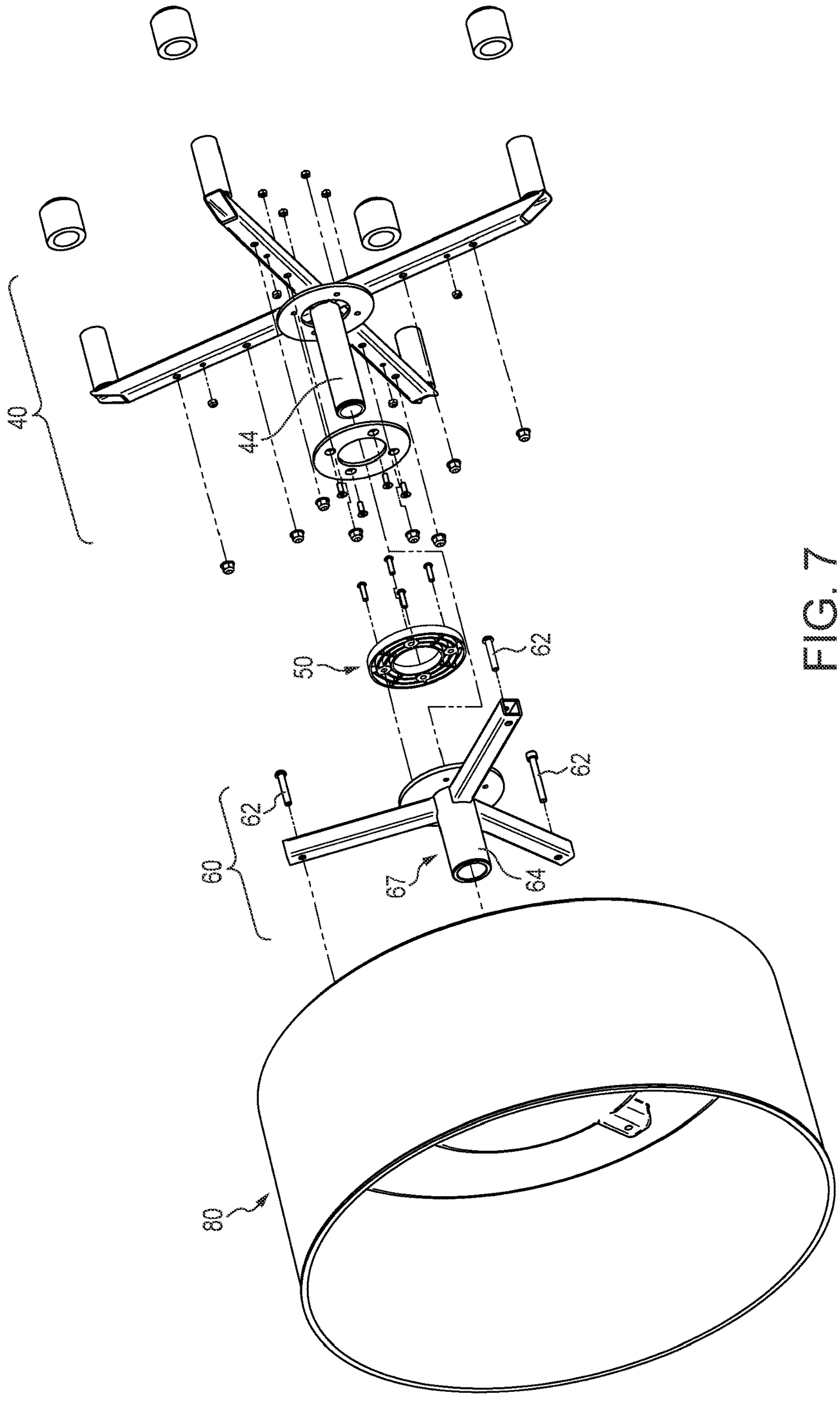
FIG. 7 is a detailed exploded assembly view of an outer drum and associated components.

FIG. 7 is a detailed exploded assembly view illustrating the previously described primary drum support assembly 40, the thrust bearing 50, the secondary drum support assembly 60, and the outer drum 80. The secondary drum support assembly 60 is secured to the outer drum 80, typically via a plurality of fasteners 62. In certain versions, the secondary drum support 60 includes at least one journal bearing 67 which as previously noted accommodates radial loads when the drain cleaner is operated in a vertical orientation. The journal bearing is typically disposed in the central receiving member 64. The primary drum support 40 includes the central support member or shaft 44 about which the journal bearing 67 rotates. Disposed between the primary and secondary drum supports 40, 60 is the thrust bearing 50. As previously noted, the thrust bearing 50 accommodates axial loads when the drain cleaner 10 is operated in a horizontal orientation.

Figure 8:
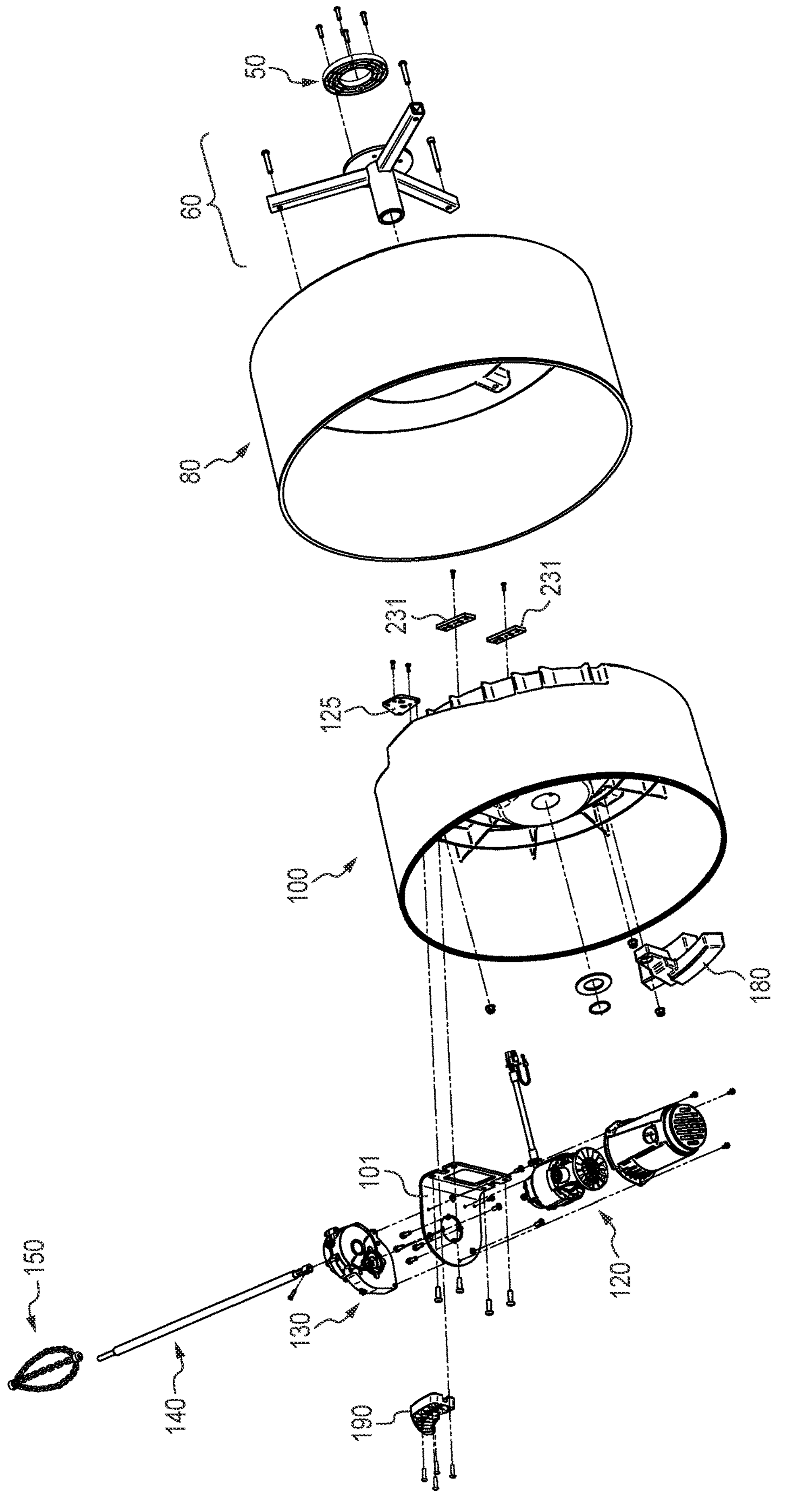
FIG. 8 is another detailed exploded assembly view of the outer drum, an inner drum, and associated components.

FIG. 8 is a detailed exploded assembly view illustrating the previously described secondary drum support assembly 60, the thrust bearing 50, and the outer drum 80, in association with the inner drum 100, the counterweight 180, the cable clamp 190, the motor 120, the gearbox 130, the cable 140, and a representative cleaning head 150. As shown in FIG. 8, the counterweight 180, the motor assembly 120, the cable clamp 190, and the gearbox 130, are all secured to or otherwise mounted to the inner drum 100, and particularly within an interior region of the inner drum 100. Mounting of these components to a wall of the inner drum 100 is facilitated using the previously noted bracket 101 (FIG. 6A) and the motor mount support plate 231 (FIG. 6B).

Figure 9:
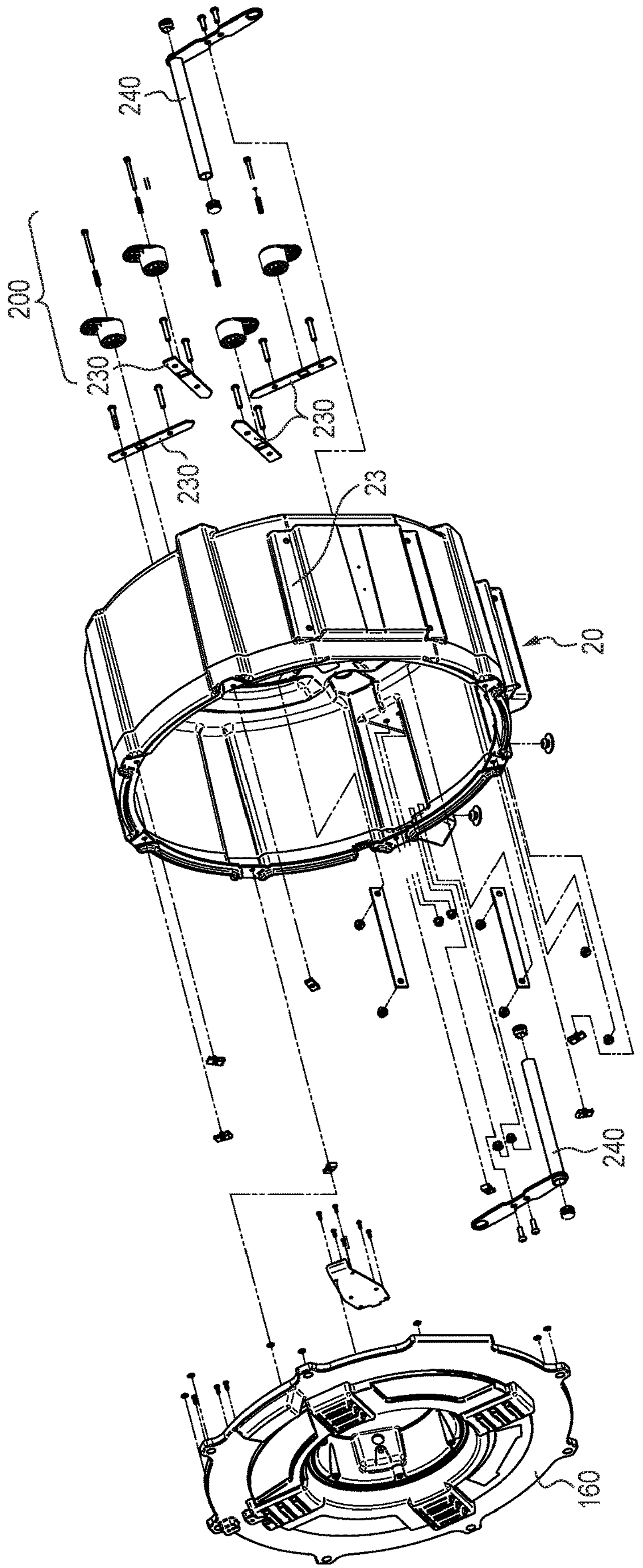
FIG. 9 is another detailed exploded assembly view of a drum housing and associated components.

FIG. 9 is another detailed exploded assembly view showing the drum housing 20, the housing cover 160, in association with portions of the handle assembly 240. FIG. 9 also illustrates the plurality of support plates 230, and the cord wrap assembly 200. Typically, the housing cover 160 is sized and shaped to closely fit over and enclose a generally hollow interior region of the drum housing 20. For versions in which the drum housing 20 is cylindrically shaped, the housing cover 160 is circular or substantially so. It will be understood that the present subject matter includes a wide array of other shapes and configurations for the drum housing 20 and/or the housing cover 160.

Figure 11:
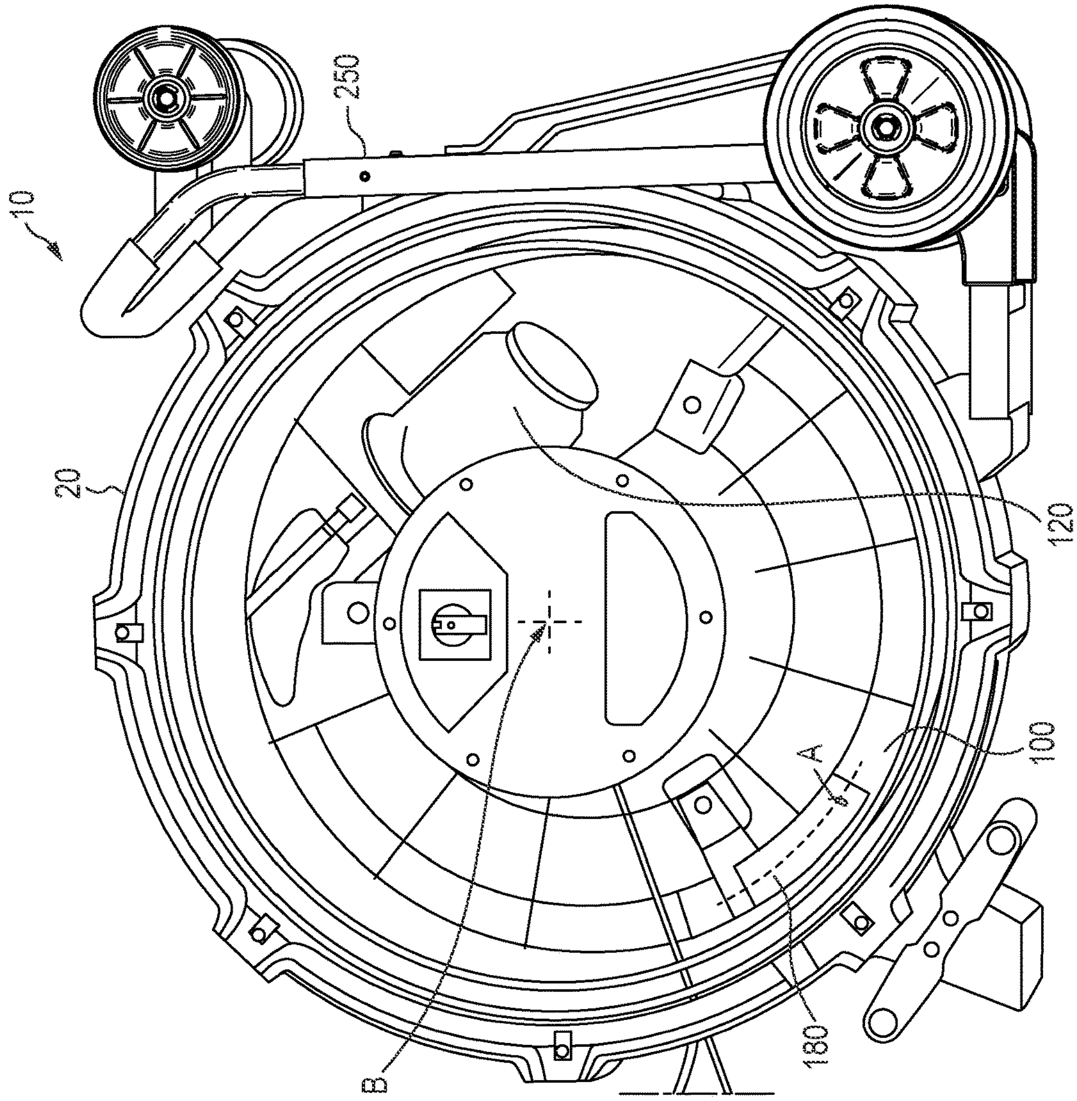
FIG. 11 is another perspective schematic view of the drain cleaner and cart of FIG. 1 illustrating the counterweight and a motor.
Figure 10:
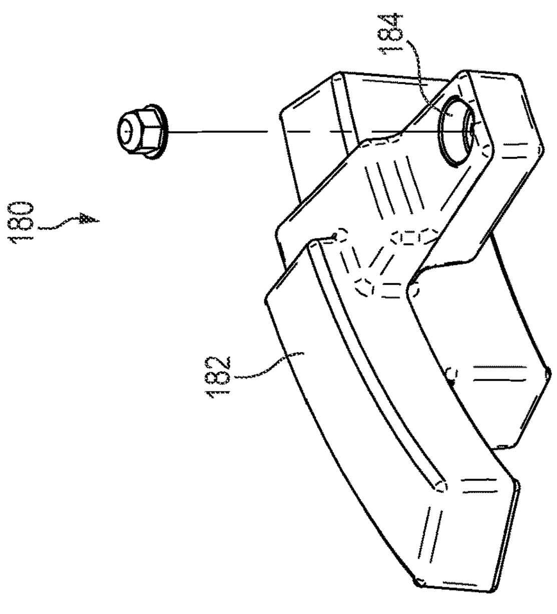
FIG. 10 is a perspective view of an embodiment of a counterweight used in certain versions of the drain cleaners of the present subject matter.

FIG. 10 is a perspective view of an embodiment of the counterweight 180. FIG. 11 is a schematic illustration showing installation of the counterweight 180 within the inner drum 100 of the drain cleaner 10. As previously noted, in certain versions the counterweight 180 includes at least a portion of the counterweight that extends along an arcuate axis of the counterweight. That portion is depicted in FIG. 10 as portion 182. Configuring the counterweight in this manner and orienting the counterweight with respect to the drum assembly such that the arcuate axis of the counterweight or its portion is concentrically oriented about the axis of rotation of the drum assembly serves to stabilize the rotating drum assembly during vertical operation of the drain cleaner 10. This aspect is illustrated in FIG. 11 in which an arcuate axis of the counterweight shown as axis A is concentrically oriented about the axis of the drum assembly, shown as axis B. The counterweight 180 also defines one or more apertures 184 for receiving a fastener or other member to thereby secure the counterweight 180 to the drum assembly and particularly the inner drum 100. It will be understood that the present subject matter includes a wide array of different shapes, geometries, and configurations for the counterweight and is not limited to the particular embodiment illustrated in FIG. 10.

FIG. 11 also illustrates the drain cleaner 10 and the cart 250 in which the housing cover 160 has been removed from the drain cleaner 10 to reveal an interior hollow region within the drum assembly. FIG. 11 shows a typical mounting arrangement for the motor 120 and the counterweight 180. As previously described, the counterweight 180 is located generally opposite from the motor 120 and gearbox 130 (not shown) so as to counter balance those components and other components associated with the drum assembly, with respect to rotation about axis B.

In many embodiments, and as described herein, the counterweight such as counterweight 180, is removably secured to the drum. However, the present subject matter also includes embodiments in which the counterweight is not removably secured to the drum. For example, the counterweight could be permanently affixed or secured to the drum. The counterweight could also be integrally formed with the drum or components of the drum. For example, the counterweight could be incorporated into a cast drum support.

Figure 13:
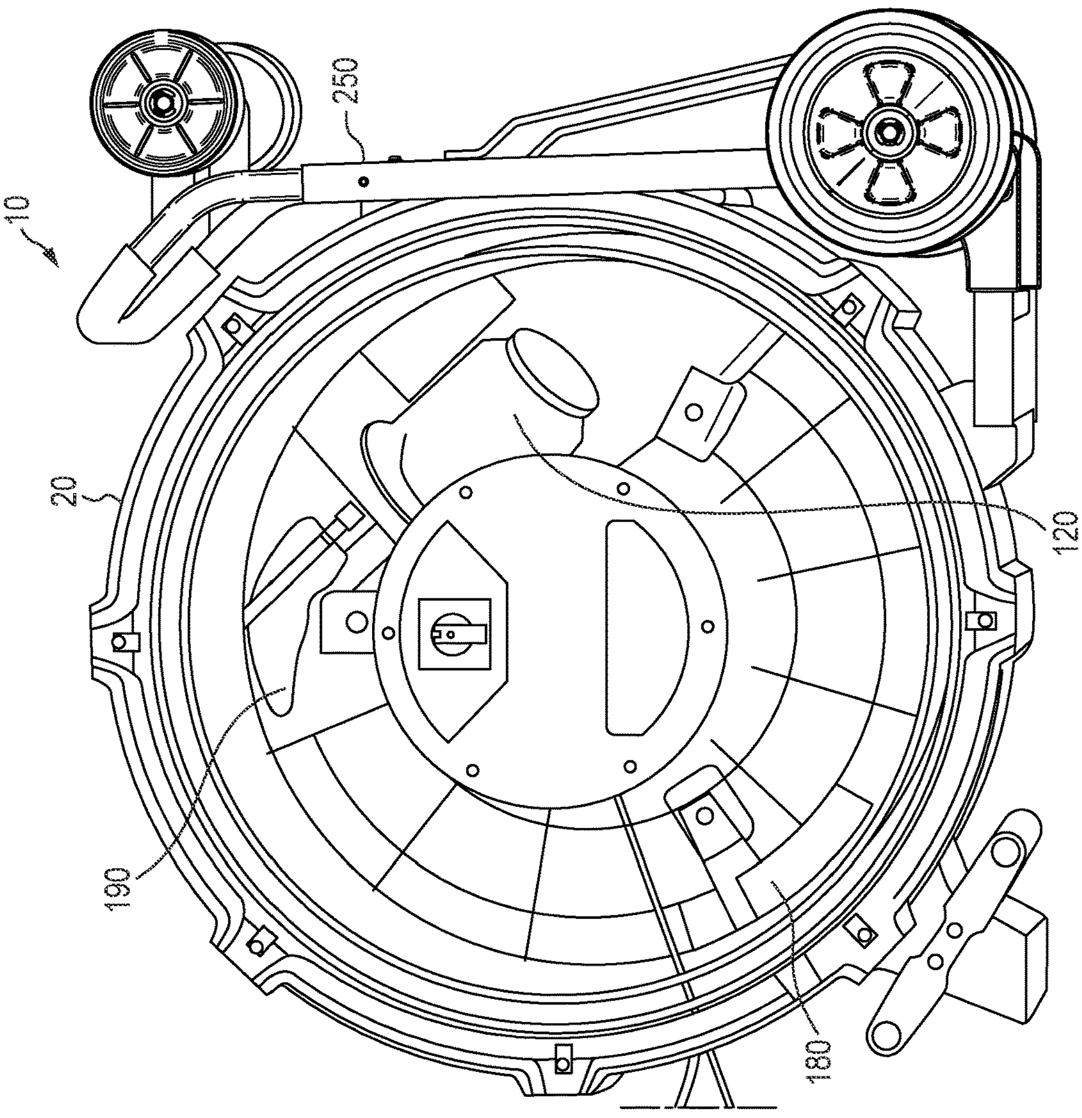
FIG. 13 is another perspective schematic view of the drain cleaner and cart of FIG. 1 illustrating the cable clamp and motor.
Figure 12:
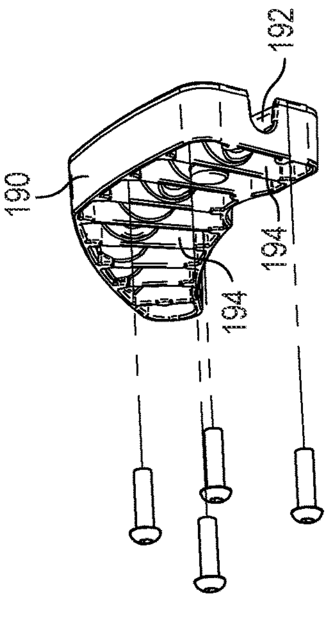
FIG. 12 is a perspective view of an embodiment of a cable clamp used in certain versions of the drain cleaners of the present subject matter.

FIG. 12 is a perspective view of an embodiment of the cable clamp 190. The cable clamp 190 defines a cable channel 192 extending along an underside of the cable clamp 190. The cable clamp 190 also includes a plurality of heat transfer fins 194 along exterior region(s) of the cable clamp 190. One or more fasteners are typically used to secure the cable clamp 190 to the drum assembly, and particularly to the inner drum 100 as shown in FIG. 13. Additionally, the fasteners securing the cable clamp 190 to the inner drum 100 may also pass through a cable clamp support plate 232 (FIG. 6B). As previously noted, the cable clamps 190 are typically replaceable and can be easily removed from the inner drum 100 so that a cable clamp differing in size, shape, configuration, or some other aspect, can be used.

FIG. 13 illustrates the drain cleaner 10 and the cart 250 in which the housing cover 160 has been removed from the drain cleaner 10 to reveal an interior hollow region within the drum assembly. FIG. 13 shows a typical mounting arrangement for the motor 120, the counterweight 180, and the cable clamp 190. FIG. 13 also illustrates a portion of the flexible cable 140. As will be understood, the cable clamp 190 is positioned over the cable 140 such that the cable 140 is disposed in the cable channel 192. The cable clamp 190 is secured to a wall of the inner drum 100.

In many embodiments, the drain cleaners 10 include both of the counterweight 180 and the cable clamp 190. However, the present subject matter includes drain cleaners free of either the counterweight 180 or the cable clamp 190. Furthermore, it is also preferred that the drain cleaners of the present subject matter include a rotatable drum that is free of exhibiting any positional preference.

As previously noted, the drain cleaners of the present subject matter can be operated in a horizontal orientation such as depicted in FIG. 14. FIG. 14 is a cross sectional view of the drain cleaner 10 and the cart 250 illustrating various components assembled within the drain cleaner 10. Specifically, the inner drum 100 is positioned within the outer drum 80. The motor 120 and gearbox 130 are secured to the inner drum 100. The drums 80, 100 and various components secured thereto are disposed within the drum housing 20 and enclosed within the drum housing 20 by the housing cover 160. As previously noted, in certain versions, the motor 120 is mounted to the inner drum 100 at a relatively small angle, to promote transition between the gearbox 130 and the cable 140 (not shown). Referring to FIG. 14, this angle is measured from a back plane C of the inner drum 100 to the axis of rotation of the motor 120. Typically, this angle is within a range of 1° to 20°, more preferably, the angle is within a range of 12° to 18°. FIG. 14 also illustrates a feature promoting operation of the drain cleaner 10 in a horizontal orientation. Specifically, in certain versions the primary drum support assembly 40 includes a plurality of the noted foot members 47 and shoe members 48. The foot members 47 extend transversely from the leg members 46. The foot members 47 are configured to extend from the drain cleaner 10 a distance that is greater than the maximum distance of other components of the drain cleaner 10 or the cart 250. This enables the drain cleaner 10 and its foot members 47 (and shoe members 48 if used) to contact a floor or ground surface shown as G in FIG. 14, and elevate all other components of the drain cleaner 10 and the cart 250 when the drain cleaner 10 is in a horizontal orientation.

FIG. 15 is a detailed view of a portion of the sectional view of FIG. 14 showing in greater detail the previously noted journal bearings 67 and thrust bearing 50 used in the drain cleaner 10. Specifically, the receiving region 64 of the secondary drum support assembly 60 encloses and/or retains journal bearings 67 which extend about the shaft 44 of the primary drum support assembly 40. The journal bearings 67 are positioned between the shaft 44 and the receiving region 64. The thrust bearing 50 is also positioned between the thrust plate 69 of the secondary drum support assembly 60 and the thrust bearing plate 49A of the primary drum support assembly 40. Thrust bearing plate 49A has a smooth finish to reduce friction between the thrust bearing plate 49A and thrust bearing 50. As will be understood, the assembly rotates about axis of rotation B. FIG. 15 also depicts outwardly extending leg members 46 of the primary drum support assembly 40.

Figure 16:
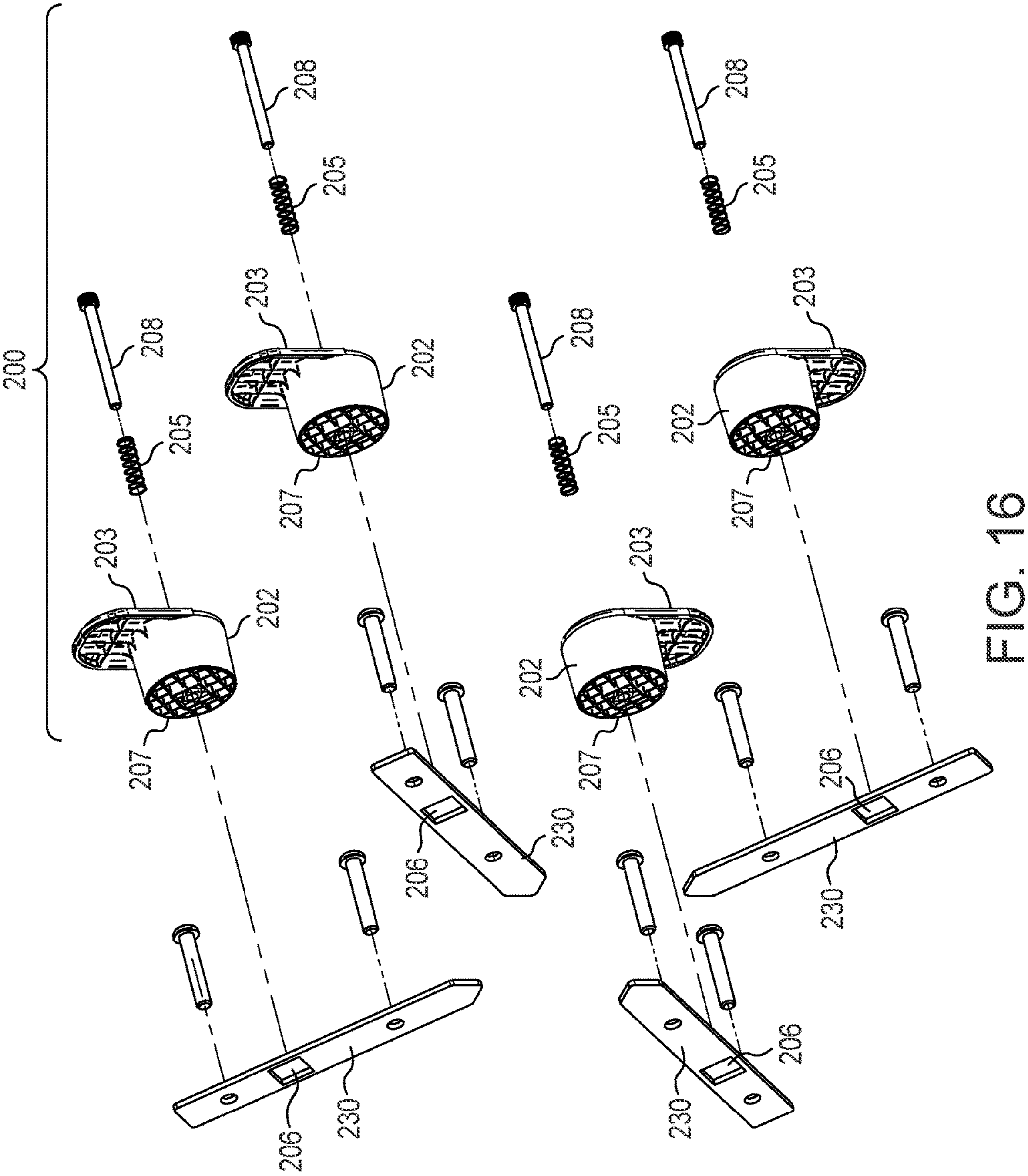
FIG. 16 is an exploded assembly view of a cord wrap system and support plates optionally utilized in the drain cleaners of the present subject matter.

FIG. 16 is an exploded assembly view of the optional cord wrap system 200 used in the drain cleaner 10. The cord wrap 200 includes a plurality of cord wrap components 202 and springs 205 for receiving and retaining an electrical power cord such as the noted power cord assembly 220 (FIG. 6F) for delivering electrical power to the drain cleaner 10 and to its motor 120. Each cord wrap component 202 is preferably affixed to one or more of the previously noted support plates 230 through an aperture 206. Each cord wrap component 202 may include a mounting projection 207 having a square shape which mates with the shape of aperture 206, thereby allowing each cord wrap component to be in four (4) different orientations 90° apart from each orientation. Each cord wrap component 202 may also include a radial projection 203 for securing the power cord assembly. Fasteners 208 may engage with springs 205 to allow for the respective cord wrap component to be biased towards the drum housing 20. As will be understood, the cord wrap components 202 are located along an exterior region of the drum housing 20 and spaced apart to promote winding of a power cord about the collection of components 202. The cord wrap system 200 and/or the cord wrap components 202 can also be configured to be used with and/or manage the foot bulb hose 176. The spring biased feature of the cord wrap components enable for quick “dumping” of the cords by lifting and rotating the cord wrap projection 203 and then pulling the cords over a relatively smooth outer edge opposite the lip.

Figure 17:
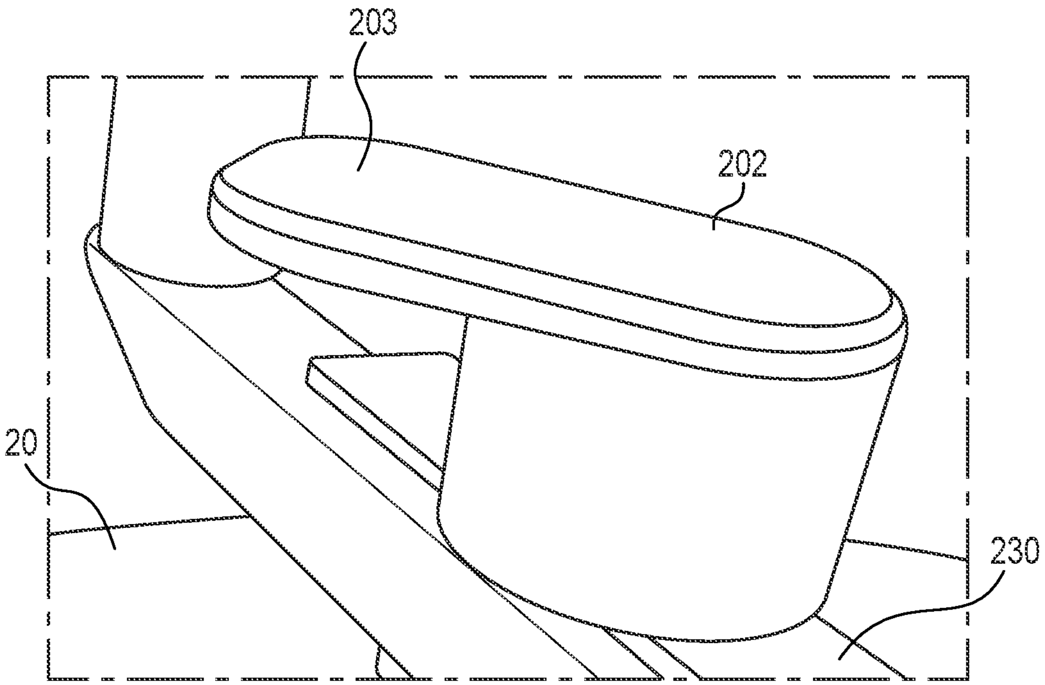
FIG. 17 is a detailed perspective view of a component of the cord wrap system depicted in FIG. 16.
Figure 18:
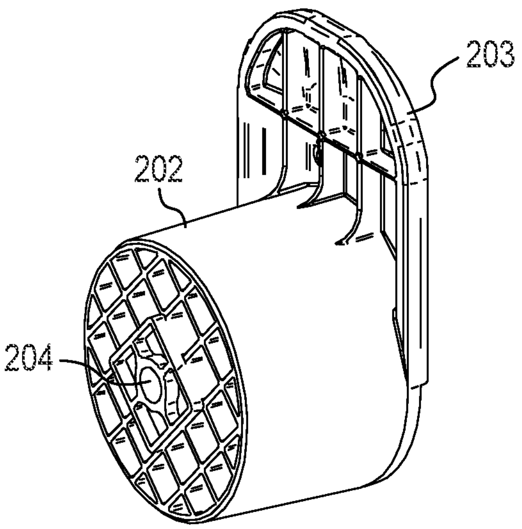
FIG. 18 is another detailed perspective view of the cord wrap component shown in FIG. 17.

FIGS. 17 and 18 are detailed views of a typical cord wrap component 202. Specifically, each cord wrap component 202 includes an outwardly extending arm 203. Each cord wrap component 202 can also include one or more apertures 204 for receiving a fastener 208 for affixing the cord wrap component 202 to the drum housing 20, and more particularly to a support plate 230.

Figure 19:
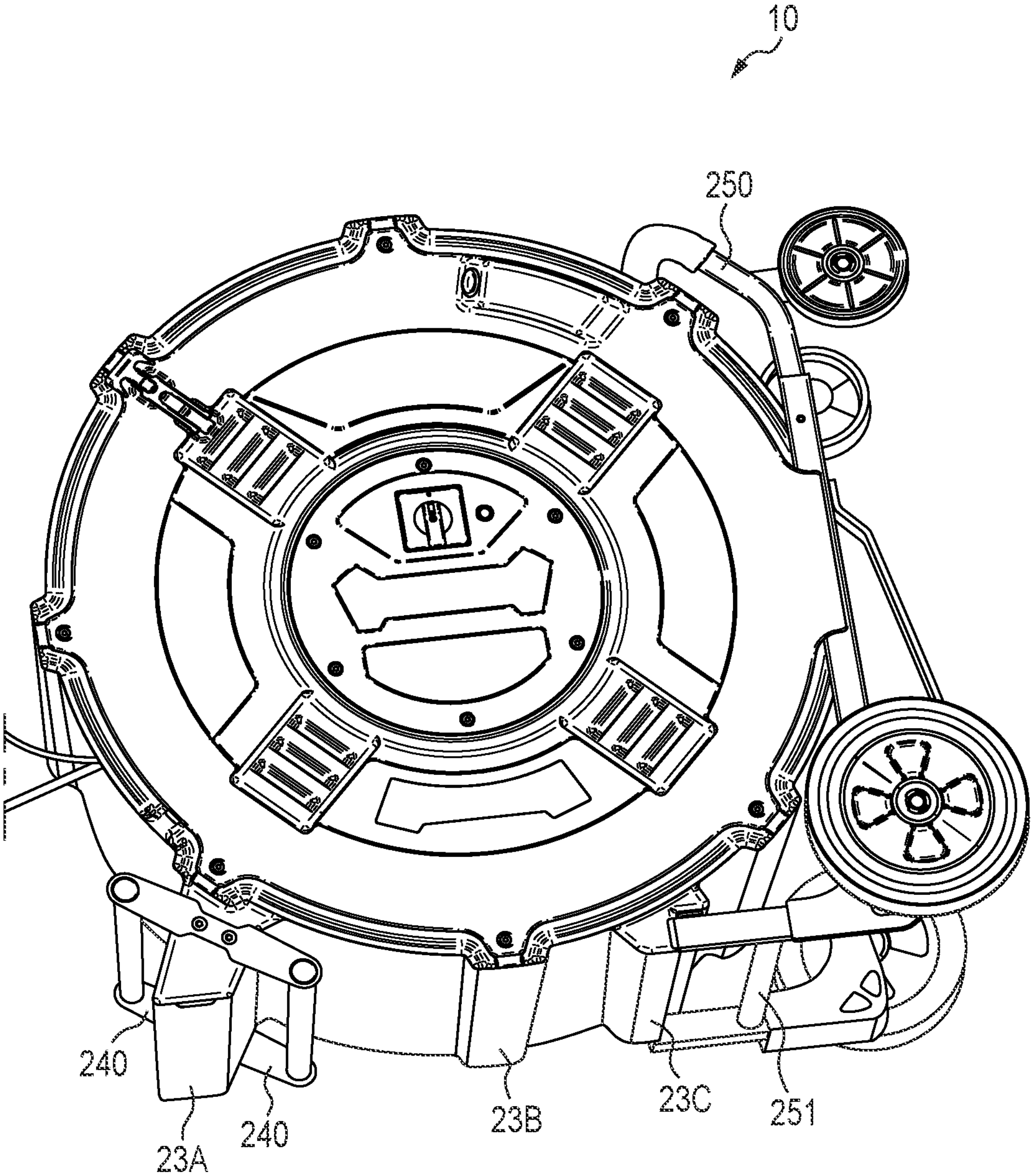
FIG. 19 is a perspective view of the drain cleaner including a plurality of gripping points.

FIG. 19 is a perspective view of the drain cleaner 10 having a plurality of gripping points or locations. The previously noted outwardly projecting supports 23A-23C are depicted with the handle assembly 240 mounted to one of the supports, typically a support farthest from the location of the cart 250, i.e., support 23A. Cart 250 includes an additional gripping point with a cross-bar 251.

Figure 20:
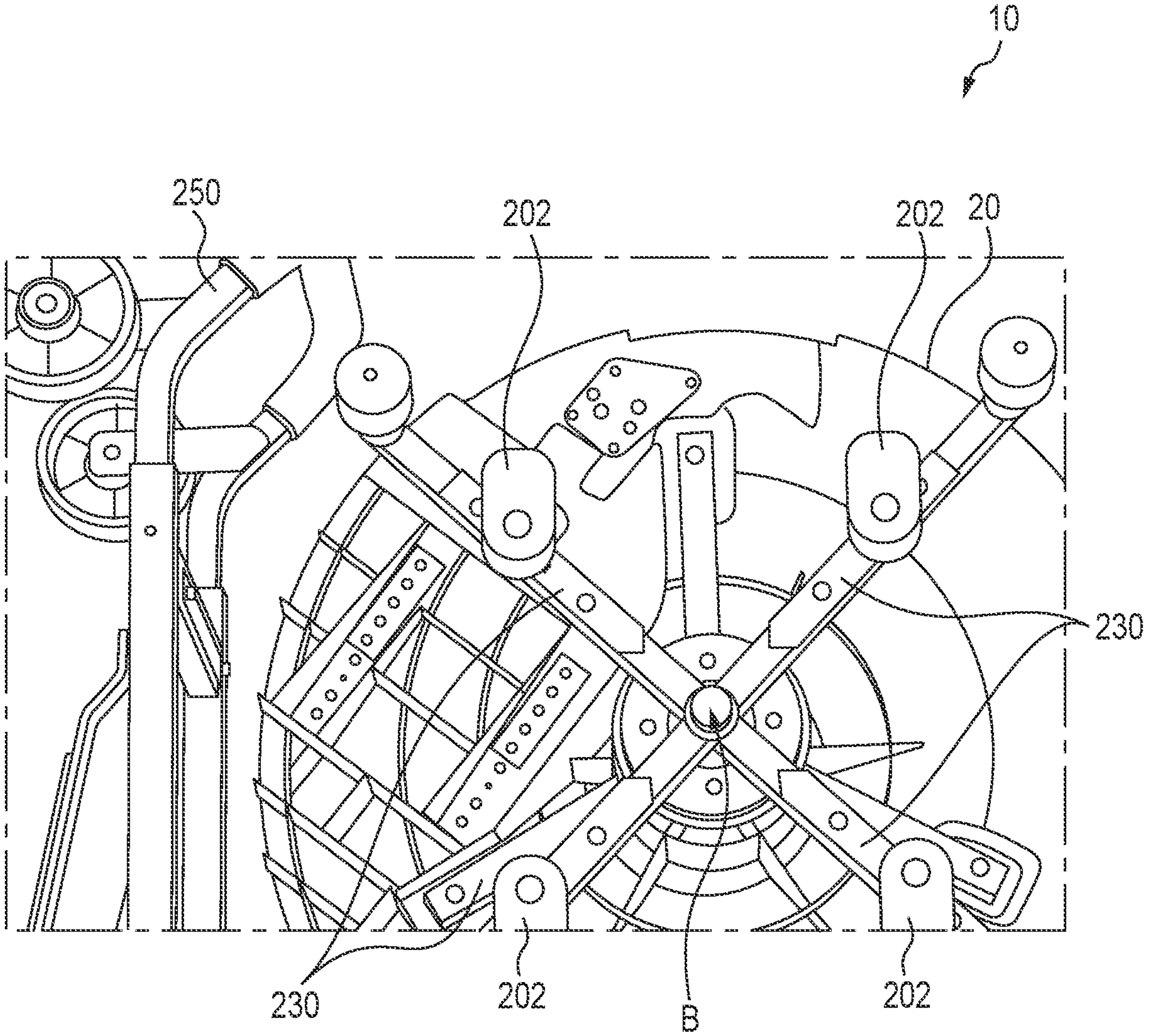
FIG. 20 is a partial perspective view of the drain cleaner illustrating additional aspects.

FIG. 20 is a partial perspective view of the drain cleaner 10 illustrating additional aspects. Specifically, the plurality of cord wrap components 202 affixed to support plates 230 extending along the drum housing 20 are depicted. The drum housing 20 encloses the rotatable drum assembly (not shown) which is rotatable about axis B. The drain cleaner 10 is shown with the cart 250.

Figure 21:
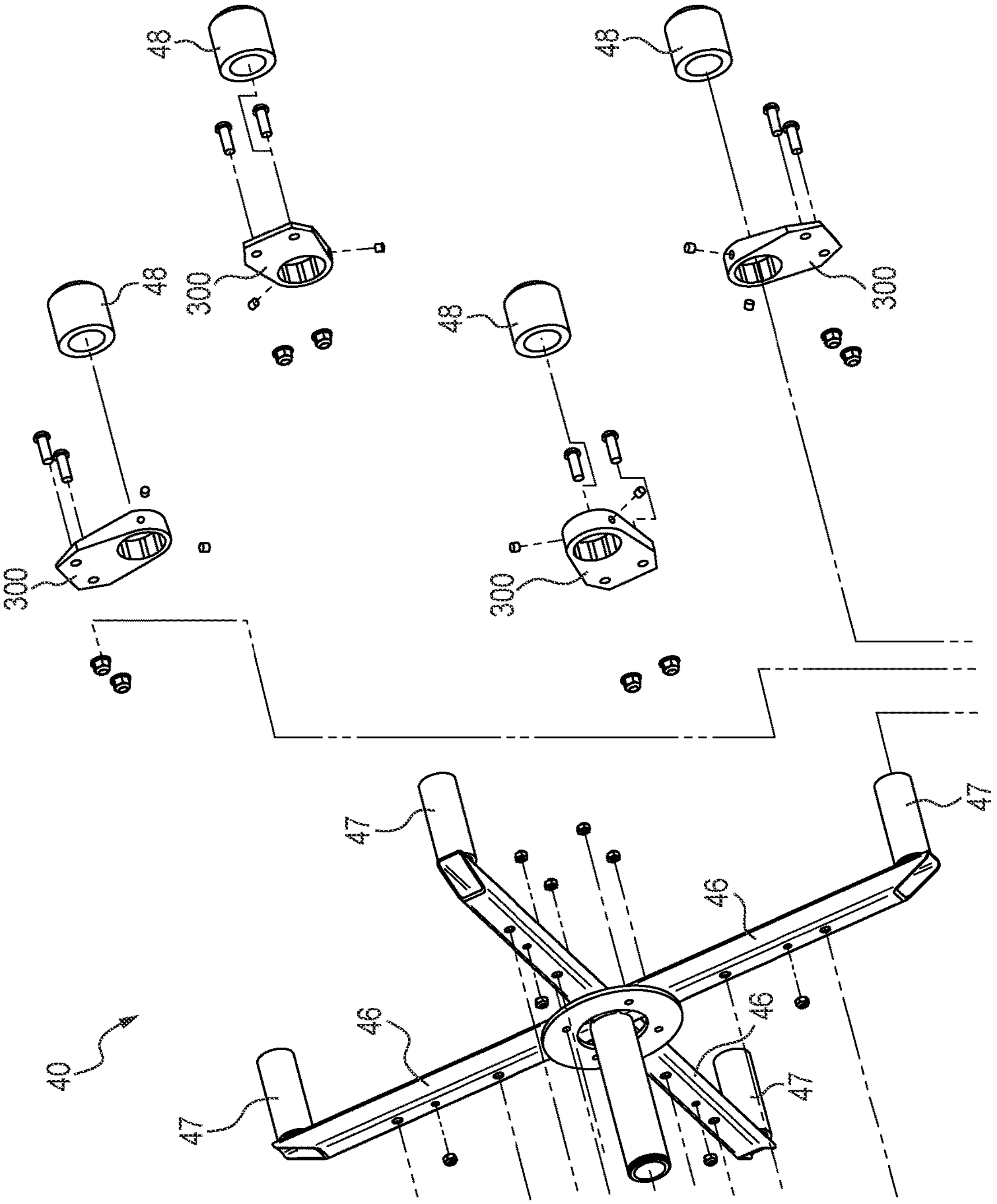
FIG. 21 is a partial exploded assembly view of a primary drum support assembly illustrating additional aspects.

FIG. 21 illustrates additional aspects of the primary drum support assembly 40 depicted in FIGS. 6D and 7. The primary drum support assembly 40 may in certain versions include one or more brackets 300. The bracket(s) 300 provide increased stiffness to the assembly 40. Each bracket 300 is configured to engage with a corresponding shoe member 48, and can be affixed or otherwise secured to a leg member 46 and/or a foot member 47 of the primary drum support assembly 40.

Figure 22:
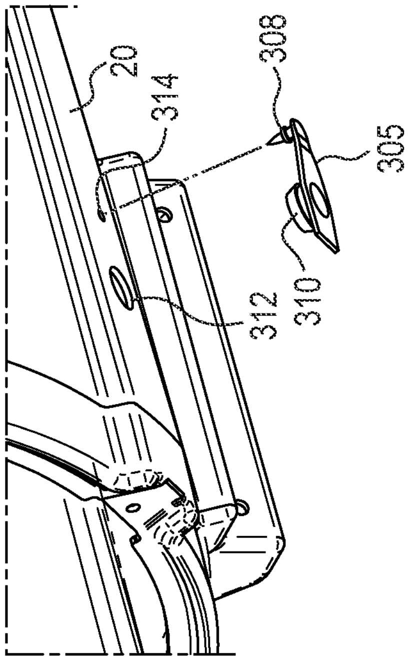
FIG. 22 illustrates an optional drain plug in a drum housing.

FIG. 22 illustrates an optional drain plug 305 incorporated in the drum housing 20. The drain plug 305 allows for liquid within the interior of the housing 20 to be drained therefrom in a controlled manner. Although the present subject matter includes a wide array of drain plugs and drain assemblies for the drum housing 20, FIG. 22 illustrates a typical form or configuration for the drain plug 305. Specifically, the drain plug 305 includes a retention member 308 and a sealing member 310. The housing 20 defines a drain aperture 312, and in the version depicted in FIG. 22, a retention aperture 314. The sealing member 310 and the drain aperture 312 are sized and/or shaped to sealingly engage together and prevent flow of liquid through the aperture 312 upon insertion of the member 310 in the aperture 312. The drain plug 305 is attached to the housing 20 by insertion of the retention member 308 in the retention aperture 314. The member 308 is frictionally secured and retained in the aperture 314. The present subject matter includes a wide array of other configurations.

Figure 23:
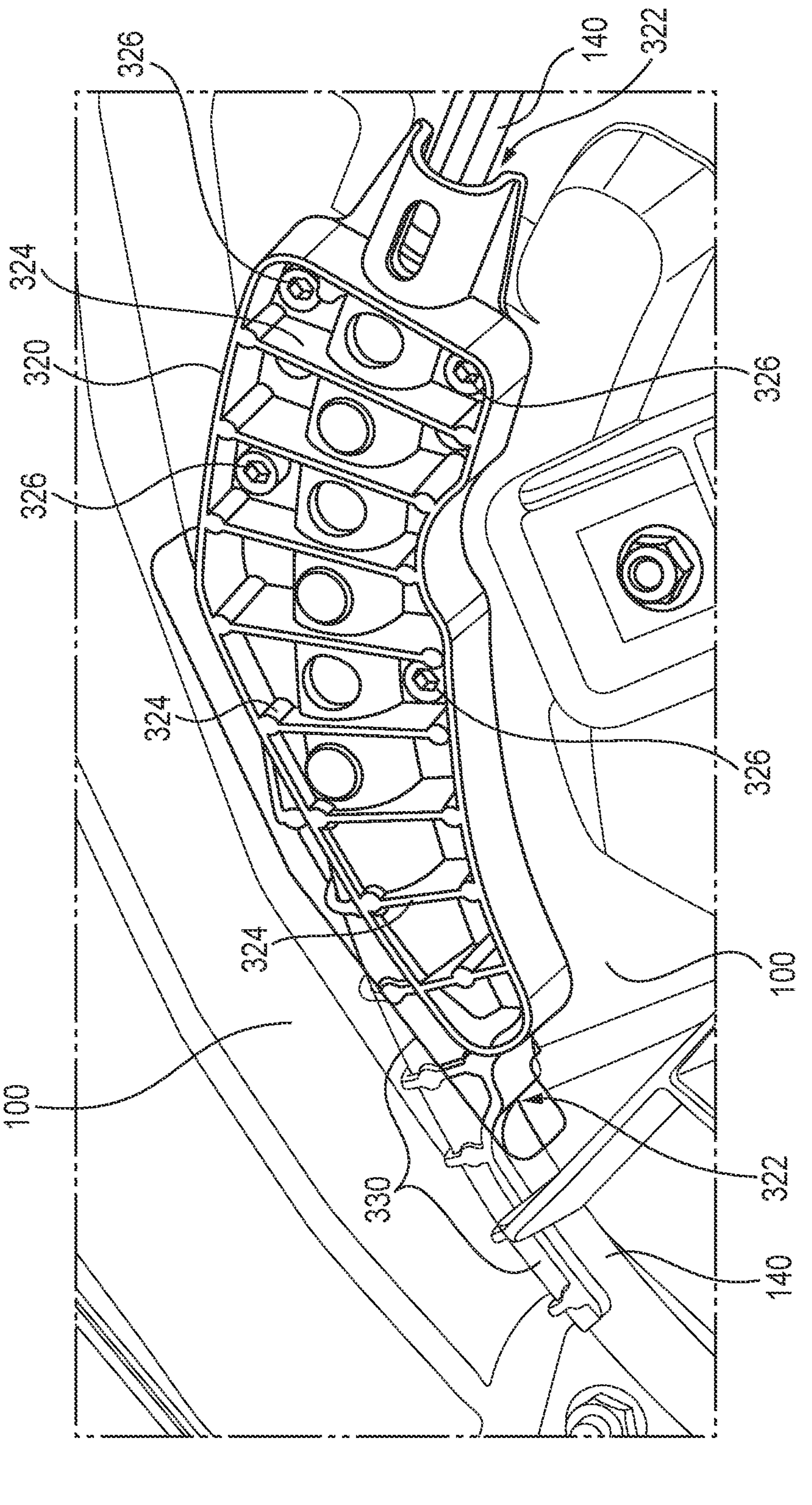
FIG. 23 illustrates another embodiment of a cable clamp.

FIG. 23 illustrates an alternate version 320 of the cable clamp 190 shown in FIGS. 6A and 12. The cable clamp 320 depicted in FIG. 23 defines a cable channel 322 extending along an underside of the cable clamp 320. The cable clamp 320 also includes a plurality of heat transfer fins 324 along exterior region(s) of the cable clamp 320. One or more fasteners 326 are typically used to secure the cable clamp 320 to the drum assembly, and particularly to the inner drum 100 as shown in FIG. 23. Additionally, the fasteners 326 securing the cable clamp 320 to the inner drum 100 may also pass through a cable clamp support plate (not shown in FIG. 23). The cable clamp 320 is typically replaceable and can be easily removed from the inner drum 100 so that a cable clamp differing in size, shape, configuration, or some other aspect, can be used. FIG. 23 also illustrates a drain cleaning cable 140 disposed within the cable channel 322. The cable clamp 320 includes an arcuate projection member 330 extending from a main body of the cable clamp 320. The projection member 330 extends the cable channel 322. As shown in FIG. 23, the projection member 330 is arcuate in shape and is configured to provide additional support to the cable 140 disposed in the cable channel 322.

Figure 24:
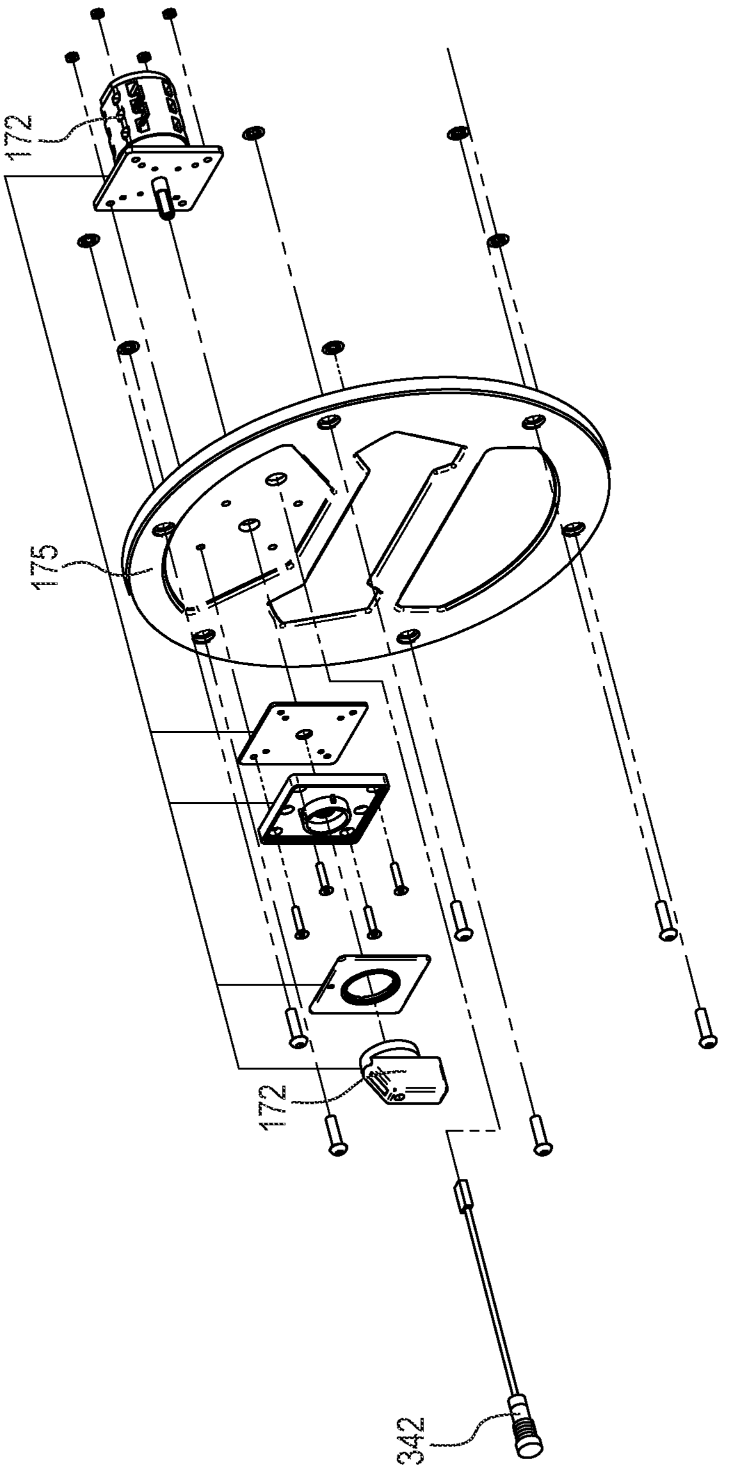
FIGS. 24 and 25 illustrate an optional i-clutch system used in certain embodiments.
Figure 25:
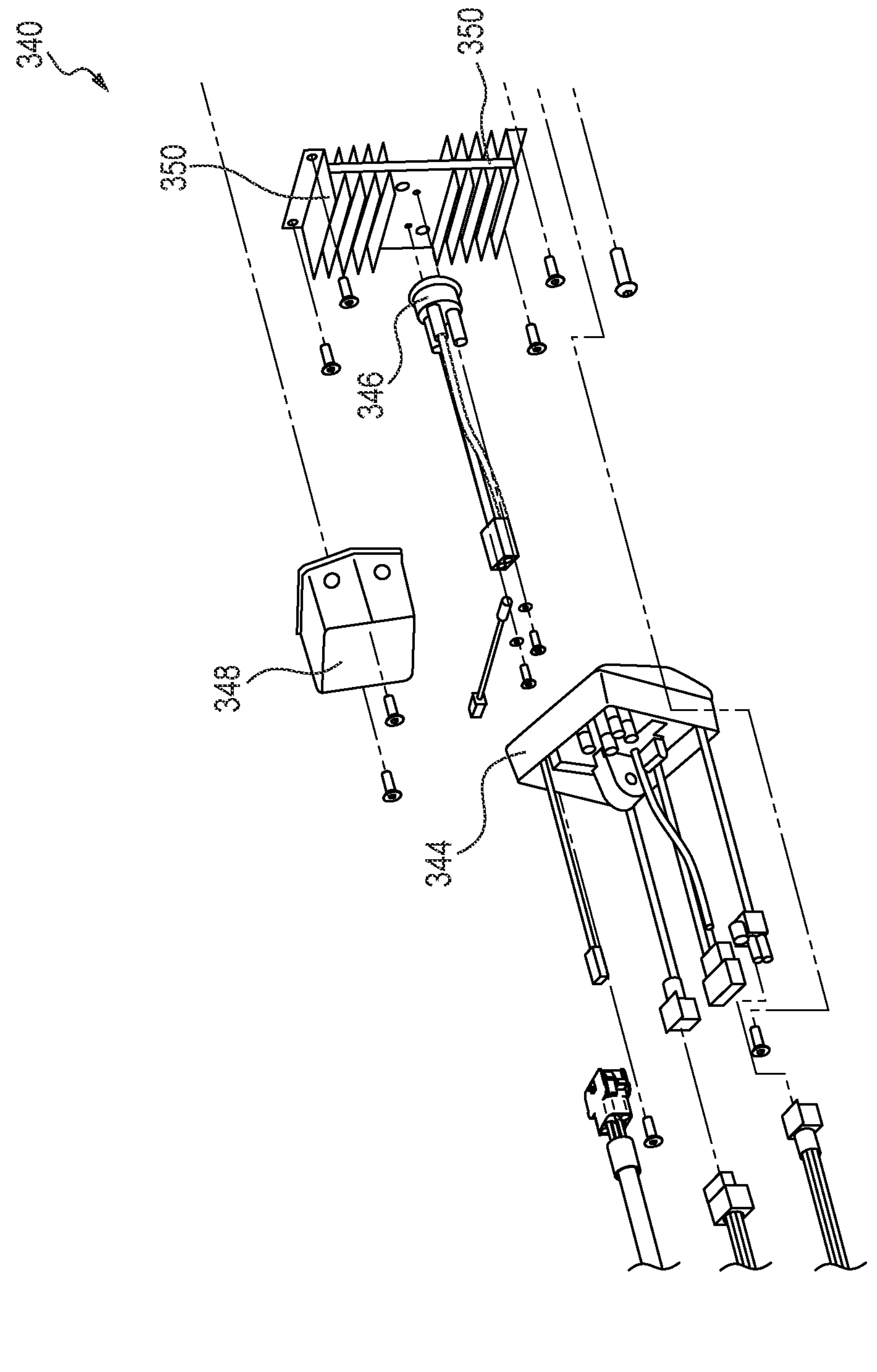

In certain embodiments, one or both of the electrical circuit breakers 174 depicted in FIG. 6E are replaced by an i-clutch system which thus serves to function as the electrical circuit breaker(s). Referring to FIG. 25, an i-clutch system 340 is shown. Referring to FIG. 24, an LED 342 or other similar indicator is mounted on the faceplate 175 which is secured to the housing cover 160, depicted in FIG. 6G. FIG. 24 illustrates the assembly shown in FIG. 6E without the circuit breakers 174. The LED 342 provides indication to a user when the i-clutch has been activated. The i-clutch system 340 generally comprises several components such as the following. An electronics assembly 344 which may be a printed circuit board (PCB), controls a soft start module 346 and cuts or otherwise disconnects electrical power to the motor (such as motor 120 in FIG. 6A) when electrical current exceeds a set threshold or other predetermined value. A suppressor 348 is utilized to reduce electrical noise and one or more heat sink(s) 350 can be used to reduce excessive heat from the electronics and surrounding assembly. FIG. 24 illustrates the one or more selector switches 172 from the assembly depicted in FIG. 6E.

Figure 26:
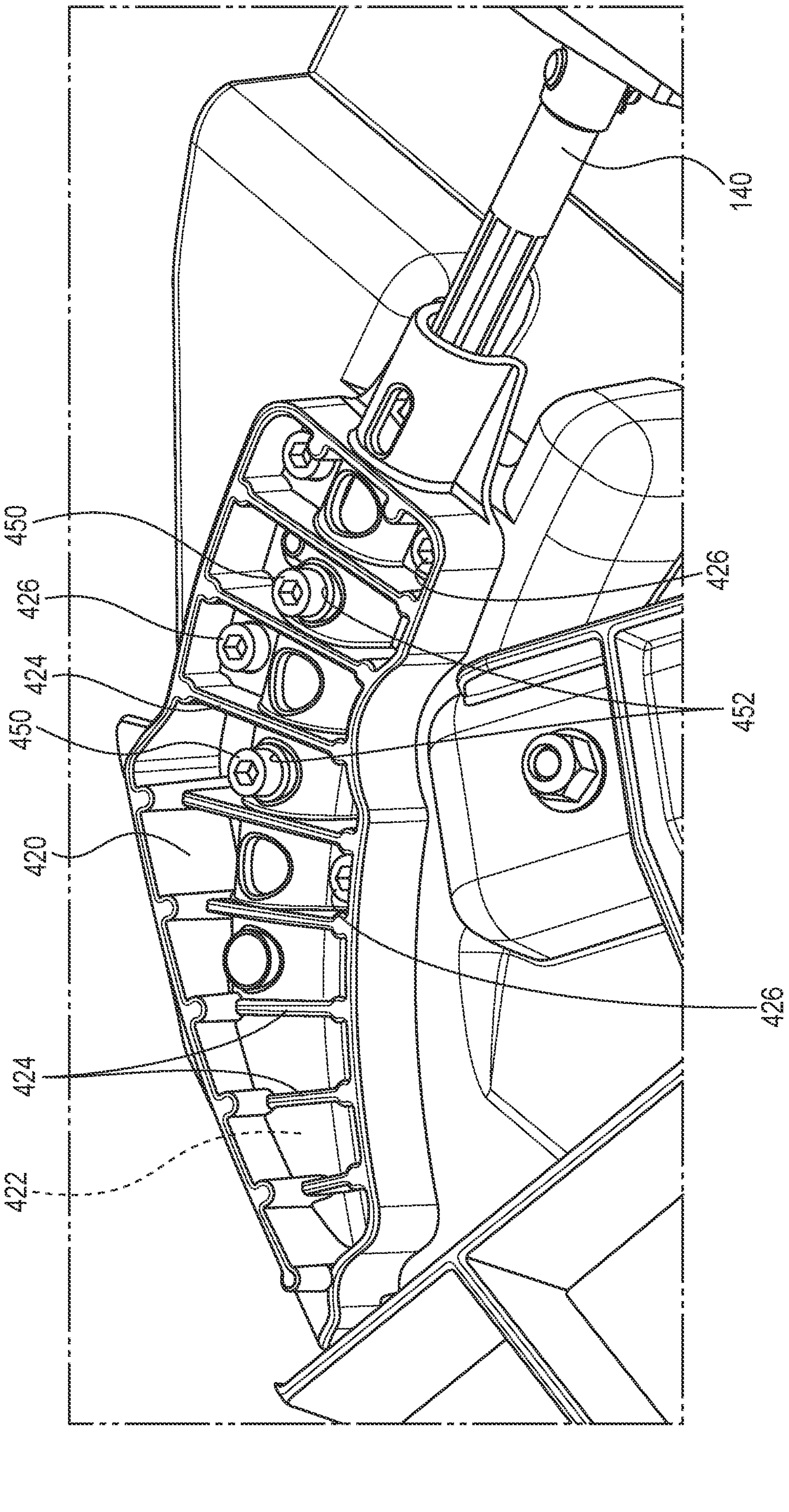
FIG. 26 is a view of another embodiment of a cable clamp.

FIG. 26 illustrates another embodiment of a cable clamp designated as cable clamp 420. The cable clamp 420 depicted in FIG. 26 defines a cable channel 422 extending along an underside of the cable clamp 420. The cable clamp 420 also includes a plurality of heat transfer fins 424 along exterior region(s) of the cable clamp 420. One or more fasteners 426 are typically used to secure the cable clamp 420 to the drum assembly, and particularly to the inner drum 100 as shown in FIG. 23. Additionally, the fasteners 426 securing the cable clamp 420 to the inner drum 100 may also pass through a cable clamp support plate (not shown in FIG. 26). The cable clamp 420 is typically replaceable and can be easily removed from the inner drum 100 so that a cable clamp differing in size, shape, configuration, or some other aspect, can be used. FIG. 26 also illustrates a drain cleaning cable 140 disposed within the cable channel 422. The cable clamp 420 defines one or more threaded apertures 452 that provide access to the drain cleaning cable 140 disposed within the cable channel 422. One or more interference fasteners 450 and preferably threaded fasteners configured to matingly engage the apertures 452, are positioned in the corresponding apertures 452. The fasteners 450 are positioned to contact or otherwise engage the outer sheath of the cable 140. This configuration provides interference with the stationary outer sheath of the cable 140. The fasteners 450 prevent or at least significantly reduce the potential for movement of the sheath within the cable channel 422 when excessive torque is applied which can occur particularly at elevated temperatures.

A wide array of fasteners and other components can be used for fasteners 450. Without being limited to any particular configuration, screws have been found to be suitable for use as fasteners 450. In certain versions, the screws are machine screws such as M6×1.00 mm. In addition, cup point set screws have exhibit favorable performance. Additional end configurations for the fasteners include, but are not limited to, a knurled end and a pointed end.

Generally, the fasteners are configured to be removable. Such a configuration promotes ease in service and cable replacement. Typically, a cable is installed by selecting an appropriate cable and connecting a cable end to the gearbox. Next, the cable clamp (removed from the inner drum) is aligned and positioned over the cable. The cable is disposed in the noted cable channel defined along an underside of the cable clamp. For cable clamps having dimension or locating lines, the cable is positioned within these lines on the clamp. The clamp is then secured to its mounting surface by mounting components. Then, the interference fasteners such as fasteners 450 depicted in FIG. 26, are tightened to thereby urge the fasteners 450 into contact with the outer sheath of the cable 140.

Figure 27:
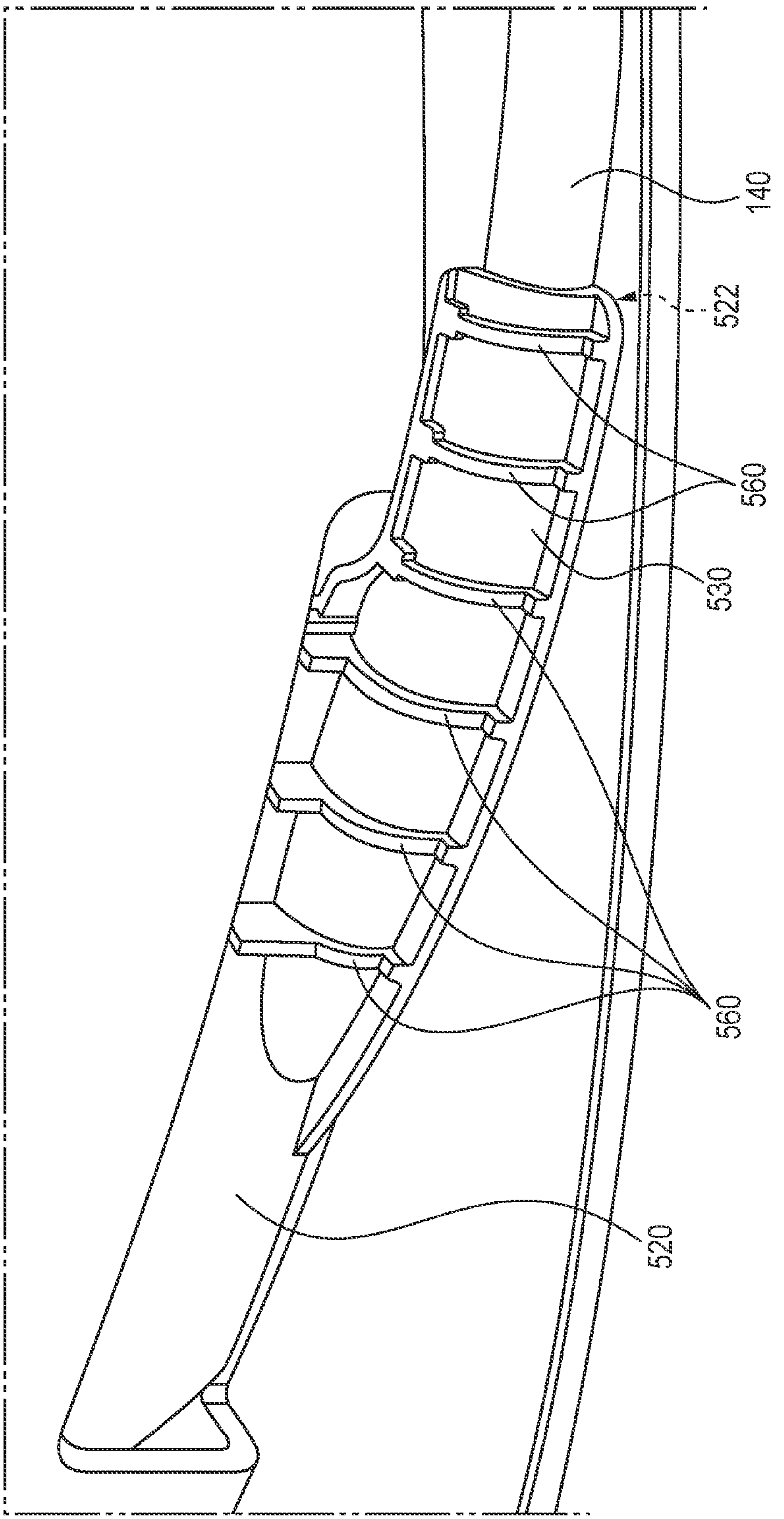
FIG. 27 is a partial view of another embodiment of a cable clamp.

FIG. 27 is a perspective view of a portion of another embodiment of a cable clamp 520. This figure depicts an arcuate projection member 530 extending from a main body of the cable clamp 520. The projection member 530 extends a cable channel 522 defined along an underside of the cable clamp 520, similar to previously described projection member 330 depicted in FIG. 23. The projection member 530 includes one or more ribs 560 that contact the drum to distribute reaction torque from the cable 140 between the drum and mounting screws (not shown). In many versions, the ribs 560 serve to transfer load and forces into the drum wall rather than all of the reaction torque being applied to the mounting components. This in turn reduces the potential for mounting components from becoming loose over time and also reduces the potential for drum fatigue under the cable clamp.

Figure 28:
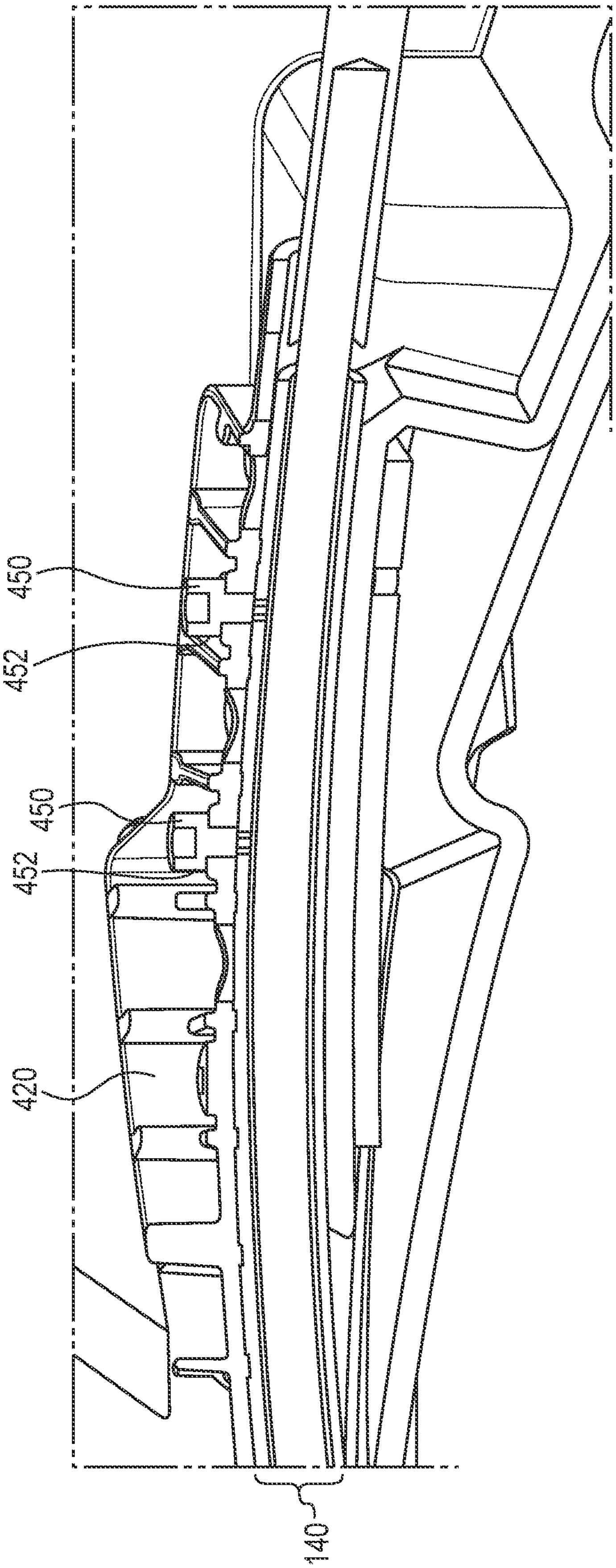
FIG. 28 is a schematic cross section of the cable clamp and related assembly depicted in FIG. 26.

FIG. 28 is a schematic cross section taken in the assembly depicted in FIG. 26, extending through a center of the fasteners 450 and the cable 140. As will be understood, the cross section is taken perpendicular to the axis of rotation of the inner portion of the cable 140.

In another embodiment, the present subject matter provides a drain cleaner comprising a housing defining an hollow interior region; a drum defining an interior surface and a channel in which a cable and sheath may be disposed, wherein the drum is disposed in the housing and rotatable about a horizontally disposed axis; a motor removably secured to the interior surface of the drum at a first location; a gearbox removably secured to the interior surface of the drum at a second location spaced from the first location; and a counterweight removably secured to the interior surface of the drum at a third location spaced from the first and second locations. The motor or the gearbox or both the drum and the gearbox are located radially outwardly from the axis of rotation of the drum. The improvement comprises the third location being spaced from the axis of rotation so that the drum is balanced. In particular versions, the improvement comprises the third location being spaced from the axis of rotation so that the drum is balanced when rotating at a first predetermined number of rotations per unit time.

In certain versions, the counterweight is configured so that, when the drum is rotating at a second predetermined number of rotations per unit time different from the first predetermined number of rotations per unit time, the drum remains dynamically balanced.

Generally, during operation of the drain cleaner, the rotational rate of the drum is constant or substantially so, for example within ±20% of a rotational rate during extending of a drain cleaning cable; or during withdrawal of a drain cleaning cable (excluding start and end phases). However, the present subject matter includes use or operation of the drain cleaner when extending or withdrawing of drain cleaning cable occurs in a non-constant or variable manner. In such instances, the rotation rate of the drum will be non-constant. In many versions, the improvements described herein still result in the drum being balanced.

In certain versions, the drain cleaner further comprises a cable clamp rotatable with the drum and removably secured to the inner surface of the drum at a fourth location. In particular versions, the cable clamp defines a recessed cable passage region along an underside of the cable clamp. In still further versions, the cable clamp further defines at least one heat transfer fin extending along and outwardly from an exterior surface region of the cable clamp.

The present subject matter provides a wide array of features and benefits. Advantages include smooth operation of the drum rotation.

A variety of alternative embodiments are contemplated such as the following. When loading the drain cleaner into a vehicle, another gripping point is needed on the lower front end of the drain cleaner. This handle has two gripping points to make it easier to grab and load the unit. This handle can also be used when negotiating a curb or step.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A drain cleaner comprising:

a housing;

a rotatable drum disposed in the housing, the drum rotatable about an axis of rotation;

a cable disposed in the rotatable drum;

an electric motor secured to the drum and rotatable with the drum; and a counterweight secured to the drum and rotatable with the drum, wherein the counterweight is distinct from any motor or drive unit and serves only to balance the drum;

a cable clamp secured to the drum and rotatable with the drum.

2. The drain cleaner of claim 1 wherein the counterweight is configured so that upon rotating the drum about the axis of rotation, the rotatable drum is free of exhibiting any positional preference.

3. The drain cleaner of claim 1 wherein the counterweight includes at least one portion that extends along an arcuate axis of the counterweight.

4. The drain cleaner of claim 3 wherein the counterweight is secured to the drum such that the arcuate axis of the counterweight is concentrically oriented about the axis of rotation of the drum.

5. The drain cleaner of claim 1 wherein the cable clamp defines (i) a recessed cable passage region along an underside of the cable clamp and (ii) at least one heat transfer fin along an exterior of the cable clamp, wherein the cable clamp guides the cable in an arcuate manner.

6. The drain cleaner of claim 1 wherein the cable clamp includes a material exhibiting a thermal conductivity of at least 10 W/m·k and is configured as a heat sink to dissipate heat from the cable during operation.

7. The drain cleaner of claim 1 further comprising:

a gearbox secured to the drum and rotatable with the drum.

8. The drain cleaner of claim 1 wherein the drum defines an annular channel for receiving and storing drain cleaning cable.

9. A drain cleaner comprising:

a housing defining an interior hollow region;

a rotatable drum disposed in the interior hollow region defined by the housing, the drum rotatable about an axis of rotation;

an electric motor secured to the drum and rotatable with the drum;

a cable clamp secured to the drum and rotatable with the drum, wherein the cable clamp is positioned adjacent to the electric motor;

wherein the cable clamp defines an arcuate cable passage that transitions a cable from an angle relative to the electric motor to be tangent to a channel of the drum, wherein the cable clamp has at least one heat transfer fin extending along an exterior of the cable clamp.

10. The drain cleaner of claim 9 wherein the cable clamp defines a recessed cable passage region along an underside of the cable clamp.

11. The drain cleaner of claim 9 further comprising:

a counterweight secured to the drum and rotatable with the drum, wherein the counterweight is positioned to balance the drum with the cable clamp and electric motor.

12. The drain cleaner of claim 11 wherein the counterweight includes at least one portion that extends along an arcuate axis of the counterweight.

13. The drain cleaner of claim 12 wherein the counterweight is secured to the drum such that the arcuate axis of the counterweight is concentrically oriented about the axis of rotation of the drum.

14. A drain cleaner comprising:

a housing defining an hollow interior region; a drum defining an interior surface and a channel in which a cable and sheath are disposed, wherein the drum is disposed in the housing and rotatable about a horizontally disposed axis; a motor removably secured to the interior surface of the drum at a first location; a gearbox removably secured to the interior surface of the drum at a second location spaced from the first location; and a cable system, with the drum being balanced by a counterweight secured to or formed along the interior surface of the drum at a third location spaced from the first and second locations, the counterweight ensuring stability during drum rotation and being separate from any cable driving mechanism; wherein the motor or the gearbox or both the motor and the gearbox are located radially outwardly from the axis of rotation of the drum;

the third location being spaced from the axis of rotation so that the drum is balanced;

a cable clamp rotatable with the drum and removably secured to the inner surface of the drum at a fourth location that provides an arcuate transition for the cable.

15. The drain cleaner of claim 14 wherein the third location being spaced from the axis of rotation so that the drum is balanced when rotating at a first predetermined number of rotations per unit time.

16. The drain cleaner of claim 15 wherein the counterweight is configured so that, when the drum is rotating at a second predetermined number of rotations per unit time different from the first predetermined number of rotations per unit time, the drum remains dynamically balanced.

17. The drain cleaner of claim 14 wherein the counterweight is removably secured to the interior surface of the drum at the third location.

18. The drain cleaner of claim 14 wherein the cable clamp defines a recessed cable passage region along an underside of the cable clamp that guides the cable along an arcuate path as the cable transitions from the drum to an outlet of the drain cleaner.

19. The drain cleaner of claim 18 wherein the cable clamp further defines at least one heat transfer fin extending along and outwardly from an exterior surface region of the cable clamp.

* * * * *